United States Patent [19]

Hanes et al.

[11] Patent Number: 5,440,719
[45] Date of Patent: Aug. 8, 1995

[54] METHOD SIMULATING DATA TRAFFIC ON NETWORK IN ACCORDANCE WITH A CLIENT/SEWER PARADIGM

[75] Inventors: Charles F. Hanes, San Jose; Colin K. Mick, Palo Alto, both of Calif.

[73] Assignee: Cadence Design Systems, Inc., San Jose, Calif.

[21] Appl. No.: 967,636

[22] Filed: Oct. 27, 1992

[51] Int. Cl.⁶ ............................................. G06F 9/455
[52] U.S. Cl. .................... 395/500; 364/DIG. 1; 364/DIG. 2; 364/264; 364/264.3; 364/284; 364/284.3; 364/284.4
[58] Field of Search .................. 364/DIG. 1, DIG. 2, 364/550, 551.01, 570, 578; 395/200, 275, 325, 500, 575, 550; 371/16.5, 19, 20.6, 13, 14, 58.3, 825.5, 60, 85.2, 85.4, 85.5

[56] References Cited

U.S. PATENT DOCUMENTS 5,247,517 9/1993 Ross et al. .......................... 370/85.5

Primary Examiner—Robert B. Harrell
Attorney, Agent, or Firm—J. P. Violette; Albert C. Smith; Philip Blair

[57] ABSTRACT

A method for modeling traffic on a network according to a Client/Server paradigm is disclosed. The method includes the steps of extracting the model parameters from known or measured interactions between a client node running a particular application and a server node with no other activity on the network. The method is repeated for each nodal configuration and for each application until the traffic for each node-application combination has been modeled with no other load on the network. Scripts are created from the paradigm parameters and are used in conjunction with a traffic generator to create discrete events mimicking the traffic which would be generated from each node. The model will insure that the traffic generated by each traffic source will be adjusted as a function of the response of the network under the load created by all of the traffic loading the network.

18 Claims, 19 Drawing Sheets

| Layer | | Description |
|---|---|---|
| | ISO OPEN INTERCONNECTION MODEL | |
| LAYER 7 | APPLICATION | ALL USER APPLICATION AND OPERATING SYSTEM FUNCTIONS |
| LAYER 6 | PRESENTATION | DATA FORMAT CONVERSION |
| LAYER 5 | SESSION | ESTABLISHMENT, MAINTENANCE, AND RELEASE OF END-TO-END DATA TRANSFER SESSION |
| LAYER 4 | TRANSPORT | RELIABLE TRANSMISSION OF MESSAGES USING ACKNOWLEDGEMENTS, AND FRAGMENTING MESSAGES INTO PACKETS ACCORDING TO MAXIMUM TRANSMIT UNIT SIZE |
| LAYER 3 | NETWORK | ROUTING OF PACKETS ON AN END-TO-END BASIS USING MULTIPLE POINT-TO-POINT DATA LINK CONNECTIONS |
| LAYER 2 | DATA LINK | ADDRESSING AND TRANSMISSION OF PACKETS ON A POINT-TO-POINT BASIS |
| LAYER 1 | PHYSICAL | ELECTRONIC ENCODING, DECODING AND TRANSMISSION OF BITS, INCLUDING ERROR DETECTION |

FIG. 5 PRIOR ART

```
E(0.0017,0,1E34)  F(0.2)  F(240)  F(8352)  F(0)  F(0)  F(0)  F(3.5E5)  F(0);
E(0.0017,0,1E34)  F(0.2)  F(240)  F(8352)  F(0)  F(0)  F(0)  F(1.8E4)  F(0);
E(0.0017,0,1E34)  F(0.2)  F(240)  F(8352)  F(0)  F(0)  F(0)  F(1.8E4)  F(0);
E(0.0017,0,1E34)  F(0.2)  F(240)  F(8352)  F(0)  F(0)  F(0)  F(1.8E4)  F(0);
RESTART
```

*FIG. 14A*

```
E(0.0296,0,1E34)  F(0.2)  F(960)  F(288)     F(0)  F(0)  F(0)  F(1.60E4)  F(0);
E(0.0256,0,1E34)  F(0.2)  F(992)  F(1088)    F(0)  F(0)  F(0)  F(1.60E4)  F(0);
E(0.3606,0,1E34)  F(0.4)  F(864)  F(832)     F(0)  F(0)  F(0)  F(1.20E4)  F(0);
E(0.0274,0,1E34)  F(0.2)  F(960)  F(1.50E4)  F(0)  F(0)  F(0)  F(1.40E4)  F(0);
E(0.0028,0,1E34)  F(0.2)  F(960)  F(6.64E4)  F(0)  F(0)  F(0)  F(2.60E4)  F(0);
E(0.0028,0,1E34)  F(0.2)  F(960)  F(6.64E4)  F(0)  F(0)  F(0)  F(2.60E4)  F(0);
E(0.0028,0,1E34)  F(0.2)  F(960)  F(6.64E4)  F(0)  F(0)  F(0)  F(2.60E4)  F(0);
E(0.0028,0,1E34)  F(0.2)  F(960)  F(6.64E4)  F(0)  F(0)  F(0)  F(2.80E4)  F(0);
E(0.0028,0,1E34)  F(0.2)  F(960)  F(6.64E4)  F(0)  F(0)  F(0)  F(2.80E4)  F(0);
RESTART
```

*FIG. 14B*

| | -100 | -102 | -104 | -106 | 108 | -110 | -112 |
|---|---|---|---|---|---|---|---|
| SUMMARY | DELTA T | SIZE | DESTINATION | SOURCE | | SUMMARY | |
| M 1 | | 60 | NETWARE SRVR | NETWARE CLNT | NCP | C | GET DIR PATH OF HANDLE 07 |
| 2 | 0.0008 | 64 | NETWARE CLNT | NETWARE SRVR | NCP | R | OK PATH=SYS:MSWORD |
| 3 | 0.0010 | 60 | NETWARE SRVR | NETWARE CLNT | NCP | C | DIR SEARCH PARMS FOR (NULL) |
| 4 | 0.0005 | 60 | NETWARE CLNT | NETWARE SRVR | NCP | R | OK NEXT=-1 |
| 5 | 0.0006 | 68 | NETWARE SRVR | NETWARE CLNT | NCP | C | DIR SEARCH WORD.??? |
| 6 | 0.0009 | 84 | NETWARE CLNT | NETWARE SRVR | NCP | R | OK FILE=WORD.COM |
| 7 | 0.0007 | 60 | NETWARE SRVR | NETWARE CLNT | NCP | C | GET DIR PATH OF HANDLE 07 |
| 8 | 0.0008 | 64 | NETWARE CLNT | NETWARE SRVR | NCP | R | OK PATH=SYS:MSWORD |
| 9 | 0.0014 | 72 | NETWARE SRVR | NETWARE CLNT | NCP | C | OPEN FILE /MSWORD/WORD.COM |
| 10 | 0.0036 | 88 | NETWARE CLNT | NETWARE SRVR | NCP | R | F=3B14 OK OPENED |
| 11 | 0.0011 | 64 | NETWARE SRVR | NETWARE CLNT | NCP | C | F=3B14 READ 512 AT 0 |
| 12 | 0.0276 | 566 | NETWARE CLNT | NETWARE SRVR | NCP | R | OK 512 BYTES READ |
| 13 | 0.0021 | 64 | NETWARE SRVR | NETWARE CLNT | NCP | C | F=3B14 READ 512 AT 512 |
| 14 | 0.0011 | 566 | NETWARE CLNT | NETWARE SRVR | NCP | R | OK 512 BYTES READ |
| 15 | 0.0012 | 64 | NETWARE SRVR | NETWARE CLNT | NCP | C | F=3B14 READ 1024 AT 1024 |
| 16 | 0.0018 | 1078 | NETWARE CLNT | NETWARE SRVR | NCP | R | OK 1024 BYTES READ |
| 17 | 0.0018 | 64 | NETWARE SRVR | NETWARE CLNT | NCP | C | F=3B14 READ 1024 AT 2048 |
| 18 | 0.0018 | 1078 | NETWARE CLNT | NETWARE SRVR | NCP | R | OK 1024 BYTES READ |
| 19 | 0.0017 | 64 | NETWARE SRVR | NETWARE CLNT | NCP | C | F=3B14 READ 1024 AT 3072 |
| 20 | 0.0018 | 1078 | NETWARE CLNT | NETWARE SRVR | NCP | R | OK 1024 BYTES READ |
| 21 | 0.0016 | 64 | NETWARE SRVR | NETWARE CLNT | NCP | C | F=3B14 READ 1024 AT 4096 |
| 22 | 0.0262 | 1078 | NETWARE CLNT | NETWARE SRVR | NCP | R | OK 1024 BYTES READ |
| 23 | 0.0017 | 64 | NETWARE SRVR | NETWARE CLNT | NCP | C | F=3B14 READ 1024 AT 5120 |
| 24 | 0.0018 | 1078 | NETWARE CLNT | NETWARE SRVR | NCP | R | OK 1024 BYTES READ |
| 25 | 0.0017 | 64 | NETWARE SRVR | NETWARE CLNT | NCP | C | F=3B14 READ 1024 AT 6144 |
| 26 | 0.0018 | 1078 | NETWARE CLNT | NETWARE SRVR | NCP | R | OK 1024 BYTES READ |
| 27 | 0.0017 | 64 | NETWARE SRVR | NETWARE CLNT | NCP | C | F=3B14 READ 1024 AT 7168 |
| 28 | 0.0018 | 1078 | NETWARE CLNT | NETWARE SRVR | NCP | R | OK 1024 BYTES READ |
| 29 | 0.0018 | 64 | NETWARE SRVR | NETWARE CLNT | NCP | C | F=3B14 READ 1024 AT 8192 |
| 30 | 0.0285 | 1078 | NETWARE CLNT | NETWARE SRVR | NCP | R | OK 1024 BYTES READ |
| 31 | 0.0017 | 64 | NETWARE SRVR | NETWARE CLNT | NCP | C | F=3B14 READ 1024 AT 9216 |
| 32 | 0.0017 | 1078 | NETWARE CLNT | NETWARE SRVR | NCP | R | OK 1024 BYTES READ |
| 33 | 0.0017 | 64 | NETWARE SRVR | NETWARE CLNT | NCP | C | F=3B14 READ 1024 AT 10240 |
| 34 | 0.0018 | 1078 | NETWARE CLNT | NETWARE SRVR | NCP | R | OK 1024 BYTES READ |
| 35 | 0.0016 | 64 | NETWARE SRVR | NETWARE CLNT | NCP | C | F=3B14 READ 1024 AT 11264 |
| 36 | 0.0018 | 1078 | NETWARE CLNT | NETWARE SRVR | NCP | R | OK 1024 BYTES READ |
| 37 | 0.0017 | 64 | NETWARE SRVR | NETWARE CLNT | NCP | C | F=3B14 READ 1024 AT 12288 |
| 38 | 0.0285 | 1078 | NETWARE CLNT | NETWARE SRVR | NCP | R | OK 1024 BYTES READ |
| 39 | 0.0018 | 64 | NETWARE SRVR | NETWARE CLNT | NCP | C | F=3B14 READ 1024 AT 13312 |
| 40 | 0.0018 | 1078 | NETWARE CLNT | NETWARE SRVR | NCP | R | OK 1024 BYTES READ |
| 41 | 0.0017 | 64 | NETWARE SRVR | NETWARE CLNT | NCP | C | F=3B14 READ 1024 AT 14336 |
| 42 | 0.0018 | 1078 | NETWARE CLNT | NETWARE SRVR | NCP | R | OK 1024 BYTES READ |
| 43 | 0.0016 | 64 | NETWARE SRVR | NETWARE CLNT | NCP | C | F=3B14 READ 1024 AT 15360 |
| 44 | 0.0018 | 1078 | NETWARE CLNT | NETWARE SRVR | NCP | R | OK 1024 BYTES READ |
| 45 | 0.0017 | 64 | NETWARE SRVR | NETWARE CLNT | NCP | C | F=3B14 READ 1024 AT 16384 |
| 46 | 0.0287 | 1078 | NETWARE CLNT | NETWARE SRVR | NCP | R | OK 1024 BYTES READ |
| 47 | 0.0017 | 64 | NETWARE SRVR | NETWARE CLNT | NCP | C | F=3B14 READ 1024 AT 17408 |
| 48 | 0.0018 | 1078 | NETWARE CLNT | NETWARE SRVR | NCP | R | OK 1024 BYTES READ |
| 49 | 0.0017 | 64 | NETWARE SRVR | NETWARE CLNT | NCP | C | F=3B14 READ 1024 AT 18432 |
| 50 | 0.0017 | 1078 | NETWARE CLNT | NETWARE SRVR | NCP | R | OK 1024 BYTES READ |
| 51 | 0.0017 | 64 | NETWARE SRVR | NETWARE CLNT | NCP | C | F=3B14 READ 1024 AT 19456 |
| 52 | 0.0017 | 1078 | NETWARE CLNT | NETWARE SRVR | NCP | R | OK 1024 BYTES READ |
| 53 | 0.0016 | 64 | NETWARE SRVR | NETWARE CLNT | NCP | C | F=3B14 READ 1024 AT 20480 |
| 54 | 0.0502 | 1078 | NETWARE CLNT | NETWARE SRVR | NCP | R | OK 1024 BYTES READ |
| 55 | 0.0017 | 64 | NETWARE SRVR | NETWARE CLNT | NCP | C | F=3B14 READ 1024 AT 21504 |
| 56 | 0.0018 | 1078 | NETWARE CLNT | NETWARE SRVR | NCP | R | OK 1024 BYTES READ |
| 57 | 0.0017 | 64 | NETWARE SRVR | NETWARE CLNT | NCP | C | F=3B14 READ 1024 AT 22528 |
| 58 | 0.0018 | 1078 | NETWARE CLNT | NETWARE SRVR | NCP | R | OK 1024 BYTES READ |
| 59 | 0.0018 | 64 | NETWARE SRVR | NETWARE CLNT | NCP | C | F=3B14 READ 1024 AT 23552 |

FIG. 15A PRIOR ART

| | 100 | 102 | 104 | 106 108 | 110 | 112 |
|---|---|---|---|---|---|---|
| SUMMARY | DELTA T | SIZE | DESTINATION | SOURCE | | SUMMARY |
| 60 | 0.0018 | 1078 | NETWARE CLNT | NETWARE SRVR | NCP R | OK 1024 BYTES READ |
| 61 | 0.0017 | 64 | NETWARE SRVR | NETWARE CLNT | NCP C | F=3B14 READ 1024 AT 24576 |
| 62 | 0.0281 | 1078 | NETWARE CLNT | NETWARE SRVR | NCP R | OK 1024 BYTES READ |
| 63 | 0.0017 | 64 | NETWARE SRVR | NETWARE CLNT | NCP C | F=3B14 READ 1024 AT 25600 |
| 64 | 0.0018 | 1078 | NETWARE CLNT | NETWARE SRVR | NCP R | OK 1024 BYTES READ |
| 65 | 0.0019 | 64 | NETWARE SRVR | NETWARE CLNT | NCP C | F=3B14 READ 1024 AT 26624 |
| 66 | 0.0018 | 1078 | NETWARE CLNT | NETWARE SRVR | NCP R | OK 1024 BYTES READ |
| 67 | 0.0016 | 64 | NETWARE SRVR | NETWARE CLNT | NCP C | F=3B14 READ 1024 AT 27648 |
| 68 | 0.0018 | 1078 | NETWARE CLNT | NETWARE SRVR | NCP R | OK 1024 BYTES READ |
| 69 | 0.0016 | 64 | NETWARE SRVR | NETWARE CLNT | NCP C | F=3B14 READ 1024 AT 28672 |
| 70 | 0.0286 | 1078 | NETWARE CLNT | NETWARE SRVR | NCP R | OK 1024 BYTES READ |
| 71 | 0.0017 | 64 | NETWARE SRVR | NETWARE CLNT | NCP C | F=3B14 READ 1024 AT 29696 |
| 72 | 0.0018 | 1078 | NETWARE CLNT | NETWARE SRVR | NCP R | OK 1024 BYTES READ |
| 73 | 0.0017 | 64 | NETWARE SRVR | NETWARE CLNT | NCP C | F=3B14 READ 1024 AT 30720 |
| 74 | 0.0020 | 1078 | NETWARE CLNT | NETWARE SRVR | NCP R | OK 1024 BYTES READ |
| 75 | 0.0017 | 64 | NETWARE SRVR | NETWARE CLNT | NCP C | F=3B14 READ 1024 AT 31744 |
| 76 | 0.0018 | 1078 | NETWARE CLNT | NETWARE SRVR | NCP R | OK 1024 BYTES READ |
| 77 | 0.0017 | 64 | NETWARE SRVR | NETWARE CLNT | NCP C | F=3B14 READ 1024 AT 32768 |
| 78 | 0.0282 | 1078 | NETWARE CLNT | NETWARE SRVR | NCP R | OK 1024 BYTES READ |
| 79 | 0.0018 | 64 | NETWARE SRVR | NETWARE CLNT | NCP C | F=3B14 READ 1024 AT 33792 |
| 80 | 0.0018 | 1078 | NETWARE CLNT | NETWARE SRVR | NCP R | OK 1024 BYTES READ |
| 81 | 0.0017 | 64 | NETWARE SRVR | NETWARE CLNT | NCP C | F=3B14 READ 1024 AT 34816 |
| 82 | 0.0018 | 1078 | NETWARE CLNT | NETWARE SRVR | NCP R | OK 1024 BYTES READ |
| 83 | 0.0017 | 64 | NETWARE SRVR | NETWARE CLNT | NCP C | F=3B14 READ 1024 AT 35840 |
| 84 | 0.0018 | 1078 | NETWARE CLNT | NETWARE SRVR | NCP R | OK 1024 BYTES READ |
| 85 | 0.0017 | 64 | NETWARE SRVR | NETWARE CLNT | NCP C | F=3B14 READ 1024 AT 36864 |
| 86 | 0.0371 | 1078 | NETWARE CLNT | NETWARE SRVR | NCP R | OK 1024 BYTES READ |
| 87 | 0.0017 | 64 | NETWARE SRVR | NETWARE CLNT | NCP C | F=3B14 READ 1024 AT 37888 |
| 88 | 0.0018 | 1078 | NETWARE CLNT | NETWARE SRVR | NCP R | OK 1024 BYTES READ |
| 89 | 0.0016 | 64 | NETWARE SRVR | NETWARE CLNT | NCP C | F=3B14 READ 1024 AT 38912 |
| 90 | 0.0018 | 1078 | NETWARE CLNT | NETWARE SRVR | NCP R | OK 1024 BYTES READ |
| 91 | 0.0016 | 64 | NETWARE SRVR | NETWARE CLNT | NCP C | F=3B14 READ 1024 AT 39936 |
| 92 | 0.0018 | 1078 | NETWARE CLNT | NETWARE SRVR | NCP R | OK 1024 BYTES READ |
| 93 | 0.0016 | 64 | NETWARE SRVR | NETWARE CLNT | NCP C | F=3B14 READ 1024 AT 40960 |
| 94 | 0.0285 | 1078 | NETWARE CLNT | NETWARE SRVR | NCP R | OK 1024 BYTES READ |
| 95 | 0.0017 | 64 | NETWARE SRVR | NETWARE CLNT | NCP C | F=3B14 READ 1024 AT 41984 |
| 96 | 0.0018 | 1078 | NETWARE CLNT | NETWARE SRVR | NCP R | OK 1024 BYTES READ |
| 97 | 0.0018 | 64 | NETWARE SRVR | NETWARE CLNT | NCP C | F=3B14 READ 1024 AT 43008 |
| 98 | 0.0017 | 1078 | NETWARE CLNT | NETWARE SRVR | NCP R | OK 1024 BYTES READ |
| 99 | 0.0017 | 64 | NETWARE SRVR | NETWARE CLNT | NCP C | F=3B14 READ 1024 AT 44032 |
| 100 | 0.0018 | 1078 | NETWARE CLNT | NETWARE SRVR | NCP R | OK 1024 BYTES READ |
| 101 | 0.0017 | 64 | NETWARE SRVR | NETWARE CLNT | NCP C | F=3B14 READ 1024 AT 45056 |
| 102 | 0.0291 | 1078 | NETWARE CLNT | NETWARE SRVR | NCP R | OK 1024 BYTES READ |
| 103 | 0.0017 | 64 | NETWARE SRVR | NETWARE CLNT | NCP C | F=3B14 READ 1024 AT 46080 |
| 104 | 0.0018 | 1078 | NETWARE CLNT | NETWARE SRVR | NCP R | OK 1024 BYTES READ |
| 105 | 0.0018 | 64 | NETWARE SRVR | NETWARE CLNT | NCP C | F=3B14 READ 1024 AT 47104 |
| 106 | 0.0018 | 1078 | NETWARE CLNT | NETWARE SRVR | NCP R | OK 1024 BYTES READ |
| 107 | 0.0016 | 64 | NETWARE SRVR | NETWARE CLNT | NCP C | F=3B14 READ 1024 AT 48128 |
| 108 | 0.0017 | 1078 | NETWARE CLNT | NETWARE SRVR | NCP R | OK 1024 BYTES READ |
| 109 | 0.0018 | 64 | NETWARE SRVR | NETWARE CLNT | NCP C | F=3B14 READ 1024 AT 49152 |
| 110 | 0.0278 | 1078 | NETWARE CLNT | NETWARE SRVR | NCP R | OK 1024 BYTES READ |
| 111 | 0.0017 | 64 | NETWARE SRVR | NETWARE CLNT | NCP C | F=3B14 READ 1024 AT 50176 |
| 112 | 0.0009 | 424 | NETWARE CLNT | NETWARE SRVR | NCP R | OK 370 BYTES READ |
| 113 | 0.0011 | 60 | NETWARE SRVR | NETWARE CLNT | NCP C | F=3B14 CLOSE FILE |
| 114 | 0.0012 | 60 | NETWARE CLNT | NETWARE SRVR | NCP R | OK |
| 115 | 0.0050 | 60 | NETWARE SRVR | NETWARE CLNT | NCP C | GET DIR PATH OF HANDLE 07 |
| 116 | 0.0009 | 64 | NETWARE CLNT | NETWARE SRVR | NCP R | OK PATH=SYS:MSWORD |
| 117 | 1.3459 | 60 | NETWARE SRVR | NETWARE CLNT | NCP C | GET DIR PATH OF HANDLE 07 |
| 118 | 0.0009 | 64 | NETWARE CLNT | NETWARE SRVR | NCP R | OK PATH=SYS:MSWORD |

*FIG. 15B* PRIOR ART

| SUMMARY | DELTA T | SIZE | DESTINATION | SOURCE | SUMMARY | |
|---|---|---|---|---|---|---|
| 119 | 0.0010 | 70 | NETWARE SRVR | NETWARE CLNT | NCP C | SEARCH FOR FILE /MSWORD/MW.PGM |
| 120 | 0.0030 | 84 | NETWARE CLNT | NETWARE SRVR | NCP R | OK FILE=MW.PGM |
| 121 | 0.0011 | 70 | NETWARE SRVR | NETWARE CLNT | NCP C | OPEN FILE /MSWORD/MW.PGM |
| 122 | 0.0037 | 88 | NETWARE CLNT | NETWARE SRVR | NCP R | F=B026 OK OPENED |
| 123 | 0.0007 | 64 | NETWARE SRVR | NETWARE CLNT | NCP C | F=B026 READ 512 AT 0 |
| 124 | 0.0423 | 566 | NETWARE CLNT | NETWARE SRVR | NCP R | OK 512 BYTES READ |
| 125 | 0.0016 | 64 | NETWARE SRVR | NETWARE CLNT | NCP C | F=B026 READ 608 AT 21920 |
| 126 | 0.0202 | 662 | NETWARE CLNT | NETWARE SRVR | NCP R | OK 608 BYTES READ |
| 127 | 0.0013 | 64 | NETWARE SRVR | NETWARE CLNT | NCP C | F=B026 READ 1024 AT 22528 |
| 128 | 0.0018 | 1078 | NETWARE CLNT | NETWARE SRVR | NCP R | OK 1024 BYTES READ |
| 129 | 0.0017 | 64 | NETWARE SRVR | NETWARE CLNT | NCP C | F=B026 READ 1024 AT 23552 |
| 130 | 0.0018 | 1078 | NETWARE CLNT | NETWARE SRVR | NCP R | OK 1024 BYTES READ |
| 131 | 0.0016 | 64 | NETWARE SRVR | NETWARE CLNT | NCP C | F=B026 READ 1024 AT 24576 |
| 132 | 0.0161 | 1078 | NETWARE CLNT | NETWARE SRVR | NCP R | OK 1024 BYTES READ |
| 133 | 0.0017 | 64 | NETWARE SRVR | NETWARE CLNT | NCP C | F=B026 READ 1024 AT 25600 |
| 134 | 0.0018 | 1078 | NETWARE CLNT | NETWARE SRVR | NCP R | OK 1024 BYTES READ |
| 135 | 0.0018 | 64 | NETWARE SRVR | NETWARE CLNT | NCP C | F=B026 READ 1024 AT 26624 |
| 136 | 0.0018 | 1078 | NETWARE CLNT | NETWARE SRVR | NCP R | OK 1024 BYTES READ |
| 137 | 0.0017 | 64 | NETWARE SRVR | NETWARE CLNT | NCP C | F=B026 READ 1024 AT 27648 |
| 138 | 0.0018 | 1078 | NETWARE CLNT | NETWARE SRVR | NCP R | OK 1024 BYTES READ |
| 139 | 0.0017 | 64 | NETWARE SRVR | NETWARE CLNT | NCP C | F=B026 READ 1024 AT 28672 |
| 140 | 0.0286 | 1078 | NETWARE CLNT | NETWARE SRVR | NCP R | OK 1024 BYTES READ |
| 141 | 0.0017 | 64 | NETWARE SRVR | NETWARE CLNT | NCP C | F=B026 READ 1024 AT 29696 |
| 142 | 0.0018 | 1078 | NETWARE CLNT | NETWARE SRVR | NCP R | OK 1024 BYTES READ |
| 143 | 0.0017 | 64 | NETWARE SRVR | NETWARE CLNT | NCP C | F=B026 READ 1024 AT 30720 |
| 144 | 0.0018 | 1078 | NETWARE CLNT | NETWARE SRVR | NCP R | OK 1024 BYTES READ |
| 145 | 0.0016 | 64 | NETWARE SRVR | NETWARE CLNT | NCP C | F=B026 READ 1024 AT 31744 |
| 146 | 0.0017 | 1078 | NETWARE CLNT | NETWARE SRVR | NCP R | OK 1024 BYTES READ |
| 147 | 0.0018 | 64 | NETWARE SRVR | NETWARE CLNT | NCP C | F=B026 READ 1024 AT 32768 |
| 148 | 0.0283 | 1078 | NETWARE CLNT | NETWARE SRVR | NCP R | OK 1024 BYTES READ |
| 149 | 0.0018 | 64 | NETWARE SRVR | NETWARE CLNT | NCP C | F=B026 READ 1024 AT 33792 |
| 150 | 0.0017 | 1078 | NETWARE CLNT | NETWARE SRVR | NCP R | OK 1024 BYTES READ |
| 151 | 0.0017 | 64 | NETWARE SRVR | NETWARE CLNT | NCP C | F=B026 READ 1024 AT 34816 |
| 152 | 0.0018 | 1078 | NETWARE CLNT | NETWARE SRVR | NCP R | OK 1024 BYTES READ |
| 153 | 0.0017 | 64 | NETWARE SRVR | NETWARE CLNT | NCP C | F=B026 READ 1024 AT 35840 |
| 154 | 0.0018 | 1078 | NETWARE CLNT | NETWARE SRVR | NCP R | OK 1024 BYTES READ |
| 155 | 0.0016 | 64 | NETWARE SRVR | NETWARE CLNT | NCP C | F=B026 READ 1024 AT 36864 |
| 156 | 0.0285 | 1078 | NETWARE CLNT | NETWARE SRVR | NCP R | OK 1024 BYTES READ |
| 157 | 0.0017 | 64 | NETWARE SRVR | NETWARE CLNT | NCP C | F=B026 READ 1024 AT 37888 |
| 158 | 0.0018 | 1078 | NETWARE CLNT | NETWARE SRVR | NCP R | OK 1024 BYTES READ |
| 159 | 0.0018 | 64 | NETWARE SRVR | NETWARE CLNT | NCP C | F=B026 READ 1024 AT 38912 |
| 160 | 0.0018 | 1078 | NETWARE CLNT | NETWARE SRVR | NCP R | OK 1024 BYTES READ |
| 161 | 0.0017 | 64 | NETWARE SRVR | NETWARE CLNT | NCP C | F=B026 READ 1024 AT 39936 |
| 162 | 0.0018 | 1078 | NETWARE CLNT | NETWARE SRVR | NCP R | OK 1024 BYTES READ |
| 163 | 0.0018 | 64 | NETWARE SRVR | NETWARE CLNT | NCP C | F=B026 READ 1024 AT 40960 |
| 164 | 0.0285 | 1078 | NETWARE CLNT | NETWARE SRVR | NCP R | OK 1024 BYTES READ |
| 165 | 0.0017 | 64 | NETWARE SRVR | NETWARE CLNT | NCP C | F=B026 READ 1024 AT 41984 |
| 166 | 0.0017 | 1078 | NETWARE CLNT | NETWARE SRVR | NCP R | OK 1024 BYTES READ |
| 167 | 0.0017 | 64 | NETWARE SRVR | NETWARE CLNT | NCP C | F=B026 READ 1024 AT 43008 |
| 168 | 0.0018 | 1078 | NETWARE CLNT | NETWARE SRVR | NCP R | OK 1024 BYTES READ |
| 169 | 0.0017 | 64 | NETWARE SRVR | NETWARE CLNT | NCP C | F=B026 READ 1024 AT 44032 |
| 170 | 0.0018 | 1078 | NETWARE CLNT | NETWARE SRVR | NCP R | OK 1024 BYTES READ |
| 171 | 0.0018 | 64 | NETWARE SRVR | NETWARE CLNT | NCP C | F=B026 READ 1024 AT 45056 |
| 172 | 0.0287 | 1078 | NETWARE CLNT | NETWARE SRVR | NCP R | OK 1024 BYTES READ |
| 173 | 0.0018 | 64 | NETWARE SRVR | NETWARE CLNT | NCP C | F=B026 READ 1024 AT 46080 |
| 174 | 0.0018 | 1078 | NETWARE CLNT | NETWARE SRVR | NCP R | OK 1024 BYTES READ |
| 175 | 0.0017 | 64 | NETWARE SRVR | NETWARE CLNT | NCP C | F=B026 READ 1024 AT 47104 |
| 176 | 0.0018 | 1078 | NETWARE CLNT | NETWARE SRVR | NCP R | OK 1024 BYTES READ |
| 177 | 0.0018 | 64 | NETWARE SRVR | NETWARE CLNT | NCP C | F=B026 READ 1024 AT 48128 |

FIG. 15C PRIOR ART

| | 100 | 102 | 104 | 106 | 108 | 110 | 112 |
|---|---|---|---|---|---|---|---|
| SUMMARY | DELTA T | SIZE | DESTINATION | SOURCE | | SUMMARY | |
| M 1 | | 154 | CORKY | ZEUS | NFS | C F=E113 READ 8192 AT | 12525568 |
| 2 | 0.0027 | 1514 | ZEUS | CORKY | NFS | R OK (8192 BYTES) | |
| 3 | 0.0012 | 1514 | ZEUS | CORKY | UDP | CONTINUATION ID=28462 | |
| 4 | 0.0013 | 1514 | ZEUS | CORKY | UDP | CONTINUATION ID=28462 | |
| 5 | 0.0011 | 1514 | ZEUS | CORKY | UDP | CONTINUATION ID=28462 | |
| 6 | 0.0012 | 1514 | ZEUS | CORKY | UDP | CONTINUATION ID=28462 | |
| 7 | 0.0007 | 934 | ZEUS | CORKY | UDP | CONTINUATION ID=28462 | |
| 8 | 0.0027 | 154 | CORKY | ZEUS | NFS | C F=E113 READ 8192 AT | 10199040 |
| 9 | 0.0030 | 1514 | ZEUS | CORKY | NFS | R OK (8192 BYTES) | |
| 10 | 0.0012 | 1514 | ZEUS | CORKY | UDP | CONTINUATION ID=28463 | |
| 11 | 0.0013 | 1514 | ZEUS | CORKY | UDP | CONTINUATION ID=28463 | |
| 12 | 0.0011 | 1514 | ZEUS | CORKY | UDP | CONTINUATION ID=28463 | |
| 13 | 0.0012 | 1514 | ZEUS | CORKY | UDP | CONTINUATION ID=28463 | |
| 14 | 0.0007 | 934 | ZEUS | CORKY | UDP | CONTINUATION ID=28463 | |
| 15 | 0.0038 | 154 | CORKY | ZEUS | NFS | C F=E113 READ 4096 AT | 7888896 |
| 16 | 0.0025 | 1514 | ZEUS | CORKY | NFS | R OK (4096 BYTES) | |
| 17 | 0.0012 | 1514 | ZEUS | CORKY | UDP | CONTINUATION ID=28464 | |
| 18 | 0.0009 | 1278 | ZEUS | CORKY | UDP | CONTINUATION ID=28464 | |
| 19 | 0.0048 | 154 | CORKY | ZEUS | NFS | C F=E113 READ 4096 AT | 14409728 |
| 20 | 0.0025 | 1514 | ZEUS | CORKY | NFS | R OK (4096 BYTES) | |
| 21 | 0.0013 | 1514 | ZEUS | CORKY | UDP | CONTINUATION ID=28465 | |
| 22 | 0.0009 | 1278 | ZEUS | CORKY | UDP | CONTINUATION ID=28465 | |
| 23 | 0.0047 | 154 | CORKY | ZEUS | NFS | C F=E113 READ 8192 AT | 13246464 |
| 24 | 0.0026 | 1514 | ZEUS | CORKY | NFS | R OK (8192 BYTES) | |
| 25 | 0.0013 | 1514 | ZEUS | CORKY | UDP | CONTINUATION ID=28466 | |
| 26 | 0.0013 | 1514 | ZEUS | CORKY | UDP | CONTINUATION ID=28466 | |
| 27 | 0.0011 | 1514 | ZEUS | CORKY | UDP | CONTINUATION ID=28466 | |
| 28 | 0.0011 | 1514 | ZEUS | CORKY | UDP | CONTINUATION ID=28466 | |
| 29 | 0.0007 | 934 | ZEUS | CORKY | UDP | CONTINUATION ID=28466 | |
| 30 | 0.0040 | 154 | CORKY | ZEUS | NFS | C F=E113 READ 8192 AT | 3383296 |
| 31 | 0.0025 | 1514 | ZEUS | CORKY | NFS | R OK (8192 BYTES) | |
| 32 | 0.0012 | 1514 | ZEUS | CORKY | UDP | CONTINUATION ID=28467 | |
| 33 | 0.0013 | 1514 | ZEUS | CORKY | UDP | CONTINUATION ID=28467 | |
| 34 | 0.0011 | 1514 | ZEUS | CORKY | UDP | CONTINUATION ID=28467 | |
| 35 | 0.0012 | 1514 | ZEUS | CORKY | UDP | CONTINUATION ID=28467 | |
| 36 | 0.0007 | 934 | ZEUS | CORKY | UDP | CONTINUATION ID=28467 | |
| 37 | 0.0037 | 154 | CORKY | ZEUS | NFS | C F=E113 READ 8192 AT | 12247040 |
| 38 | 0.0025 | 1514 | ZEUS | CORKY | NFS | R OK (8192 BYTES) | |
| 39 | 0.0012 | 1514 | ZEUS | CORKY | UDP | CONTINUATION ID=28468 | |
| 40 | 0.0013 | 1514 | ZEUS | CORKY | UDP | CONTINUATION ID=28468 | |
| 41 | 0.0011 | 1514 | ZEUS | CORKY | UDP | CONTINUATION ID=28468 | |
| 42 | 0.0012 | 1514 | ZEUS | CORKY | UDP | CONTINUATION ID=28468 | |
| 43 | 0.0007 | 934 | ZEUS | CORKY | UDP | CONTINUATION ID=28468 | |
| 44 | 0.0032 | 154 | CORKY | ZEUS | NFS | C F=E113 READ 4096 AT | 16281600 |
| 45 | 0.0024 | 1514 | ZEUS | CORKY | NFS | R OK (4096 BYTES) | |
| 46 | 0.0012 | 1514 | ZEUS | CORKY | UDP | CONTINUATION ID=28469 | |
| 47 | 0.0010 | 1278 | ZEUS | CORKY | UDP | CONTINUATION ID=28469 | |
| 48 | 0.0043 | 154 | CORKY | ZEUS | NFS | C F=E113 READ 4096 AT | 8560640 |
| 49 | 0.0025 | 1514 | ZEUS | CORKY | NFS | R OK (4096 BYTES) | |
| 50 | 0.0013 | 1514 | ZEUS | CORKY | UDP | CONTINUATION ID=28470 | |
| 51 | 0.0009 | 1278 | ZEUS | CORKY | UDP | CONTINUATION ID=28470 | |
| 52 | 0.0001 | 154 | CORKY | ZEUS | NFS | C F=E113 READ 8192 AT | 14876672 |
| 53 | 0.0027 | 1514 | ZEUS | CORKY | NFS | R OK (8192 BYTES) | |
| 54 | 0.0012 | 1514 | ZEUS | CORKY | UDP | CONTINUATION ID=28471 | |
| 55 | 0.0012 | 1514 | ZEUS | CORKY | UDP | CONTINUATION ID=28471 | |
| 56 | 0.0012 | 1514 | ZEUS | CORKY | UDP | CONTINUATION ID=28471 | |
| 57 | 0.0012 | 1514 | ZEUS | CORKY | UDP | CONTINUATION ID=28471 | |
| 58 | 0.0007 | 934 | ZEUS | CORKY | UDP | CONTINUATION ID=28471 | |
| 59 | 0.0296 | 154 | CORKY | ZEUS | NFS | C LOOKUP P00005 IN F=3E65 | |

FIG. 16A *PRIOR ART*

|  | ┌─100 | ┌─102 | ┌─104 | ┌─106 | 108 | ┌─110 | ┌─112 |
|---|---|---|---|---|---|---|---|
| SUMMARY | DELTA T | SIZE | DESTINATION | SOURCE |  | SUMMARY |  |
| 60 | 0.0016 | 70 | ZEUS | CORKY | NFS | R NO SUCH FILE | |
| 61 | 0.0256 | 158 | CORKY | ZEUS | NFS | C LOOKUP P00005.SBIN IN F=3E65 | |
| 62 | 0.0016 | 170 | ZEUS | CORKY | NFS | R OK F=DA73 | |
| 63 | 0.3606 | 142 | CORKY | ZEUS | NFS | C F=DA73 GET ATTRIBUTES | |
| 64 | 0.0012 | 138 | ZEUS | CORKY | NFS | R OK | |
| 65 | 0.0274 | 154 | CORKY | ZEUS | NFS | C F=DA73 READ 4096 AT 0 | |
| 66 | 0.0143 | 1514 | ZEUS | CORKY | NFS | R OK (1761 BYTES) | |
| 67 | 0.0004 | 426 | ZEUS | CORKY | UDP | CONTINUATION ID=28475 | |
| 68 | 0.0103 | 154 | CORKY | ZEUS | NFS | C F=E113 READ 8192 AT 16670720 | |
| 69 | 0.0028 | 1514 | ZEUS | CORKY | NFS | R OK (8192 BYTES) | |
| 70 | 0.0013 | 1514 | ZEUS | CORKY | UDP | CONTINUATION ID=28476 | |
| 71 | 0.0013 | 1514 | ZEUS | CORKY | UDP | CONTINUATION ID=28476 | |
| 72 | 0.0010 | 1514 | ZEUS | CORKY | UDP | CONTINUATION ID=28476 | |
| 73 | 0.0012 | 1514 | ZEUS | CORKY | UDP | CONTINUATION ID=28476 | |
| 74 | 0.0007 | 934 | ZEUS | CORKY | UDP | CONTINUATION ID=28476 | |
| 75 | 0.0128 | 154 | CORKY | ZEUS | NFS | C F=E113 READ 8192 AT 16703488 | |
| 76 | 0.0026 | 1514 | ZEUS | CORKY | NFS | R OK (8192 BYTES) | |
| 77 | 0.0013 | 1514 | ZEUS | CORKY | UDP | CONTINUATION ID=28477 | |
| 78 | 0.0013 | 1514 | ZEUS | CORKY | UDP | CONTINUATION ID=28477 | |
| 79 | 0.0011 | 1514 | ZEUS | CORKY | UDP | CONTINUATION ID=28477 | |
| 80 | 0.0012 | 1514 | ZEUS | CORKY | UDP | CONTINUATION ID=28477 | |
| 81 | 0.0007 | 934 | ZEUS | CORKY | UDP | CONTINUATION ID=28477 | |
| 82 | 0.0029 | 154 | CORKY | ZEUS | NFS | C F=E113 READ 8192 AT 4063232 | |
| 83 | 0.0026 | 1514 | ZEUS | CORKY | NFS | R OK (8192 BYTES) | |
| 84 | 0.0012 | 1514 | ZEUS | CORKY | UDP | CONTINUATION ID=28478 | |
| 85 | 0.0013 | 1514 | ZEUS | CORKY | UDP | CONTINUATION ID=28478 | |
| 86 | 0.0011 | 1514 | ZEUS | CORKY | UDP | CONTINUATION ID=28478 | |
| 87 | 0.0012 | 1514 | ZEUS | CORKY | UDP | CONTINUATION ID=28478 | |
| 88 | 0.0007 | 934 | ZEUS | CORKY | UDP | CONTINUATION ID=28478 | |
| 89 | 0.0042 | 154 | CORKY | ZEUS | NFS | C F=E113 READ 8192 AT 6619136 | |
| 90 | 0.0026 | 1514 | ZEUS | CORKY | NFS | R OK (8192 BYTES) | |
| 91 | 0.0012 | 1514 | ZEUS | CORKY | UDP | CONTINUATION ID=28479 | |
| 92 | 0.0013 | 1514 | ZEUS | CORKY | UDP | CONTINUATION ID=28479 | |
| 93 | 0.0011 | 1514 | ZEUS | CORKY | UDP | CONTINUATION ID=28479 | |
| 94 | 0.0011 | 1514 | ZEUS | CORKY | UDP | CONTINUATION ID=28479 | |
| 95 | 0.0007 | 934 | ZEUS | CORKY | UDP | CONTINUATION ID=28479 | |
| 96 | 0.0084 | 154 | CORKY | ZEUS | NFS | C F=E113 READ 8192 AT 16719872 | |
| 97 | 0.0028 | 1514 | ZEUS | CORKY | NFS | R OK (8192 BYTES) | |
| 98 | 0.0013 | 1514 | ZEUS | CORKY | UDP | CONTINUATION ID=28480 | |
| 99 | 0.0012 | 1514 | ZEUS | CORKY | UDP | CONTINUATION ID=28480 | |
| 100 | 0.0012 | 1514 | ZEUS | CORKY | UDP | CONTINUATION ID=28480 | |
| 101 | 0.0012 | 1514 | ZEUS | CORKY | UDP | CONTINUATION ID=28480 | |
| 102 | 0.0007 | 934 | ZEUS | CORKY | UDP | CONTINUATION ID=28480 | |
| 103 | 0.0049 | 154 | CORKY | ZEUS | NFS | C F=E113 READ 8192 AT 16695296 | |
| 104 | 0.0028 | 1514 | ZEUS | CORKY | NFS | R OK (8192 BYTES) | |
| 105 | 0.0012 | 1514 | ZEUS | CORKY | UDP | CONTINUATION ID=28481 | |
| 106 | 0.0014 | 1514 | ZEUS | CORKY | UDP | CONTINUATION ID=28481 | |
| 107 | 0.0010 | 1514 | ZEUS | CORKY | UDP | CONTINUATION ID=28481 | |
| 108 | 0.0012 | 1514 | ZEUS | CORKY | UDP | CONTINUATION ID=28481 | |
| 109 | 0.0007 | 934 | ZEUS | CORKY | UDP | CONTINUATION ID=28481 | |
| 110 | 0.0328 | 154 | CORKY | ZEUS | NFS | C LOOKUP P00006 IN F=3E65 | |
| 111 | 0.0018 | 70 | ZEUS | CORKY | NFS | R NO SUCH FILE | |
| 112 | 0.0254 | 158 | CORKY | ZEUS | NFS | C LOOKUP P00006.SBIN IN F=3E65 | |
| 113 | 0.0017 | 170 | ZEUS | CORKY | NFS | R OK F=290B | |
| 114 | 0.3282 | 142 | CORKY | ZEUS | NFS | C F=290B GET ATTRIBUTES | |
| 115 | 0.0011 | 138 | ZEUS | CORKY | NFS | R OK | |
| 116 | 0.0229 | 154 | CORKY | ZEUS | NFS | C F=290B READ 4096 AT 0 | |
| 117 | 0.0182 | 1514 | ZEUS | CORKY | NFS | R OK (3039 BYTES) | |
| 118 | 0.0013 | 1514 | ZEUS | CORKY | UDP | CONTINUATION ID=28485 | |

*FIG. 16B* PRIOR ART

|  | 100 | 102 | 104 | 106 | 108 | 110 | 112 |
|---|---|---|---|---|---|---|---|
| SUMMARY | DELTA T | SIZE | DESTINATION | SOURCE | | SUMMARY | |
| 119 | 0.0002 | 222 | ZEUS | CORKY | UDP | CONTINUATION ID=28485 | |
| 120 | 0.0094 | 154 | CORKY | ZEUS | NFS | C F=E113 READ 8192 AT 16834560 | |
| 121 | 0.0027 | 1514 | ZEUS | CORKY | NFS | R OK (8192 BYTES) | |
| 122 | 0.0013 | 1514 | ZEUS | CORKY | UDP | CONTINUATION ID=28486 | |
| 123 | 0.0013 | 1514 | ZEUS | CORKY | UDP | CONTINUATION ID=28486 | |
| 124 | 0.0011 | 1514 | ZEUS | CORKY | UDP | CONTINUATION ID=28486 | |
| 125 | 0.0012 | 1514 | ZEUS | CORKY | UDP | CONTINUATION ID=28486 | |
| 126 | 0.0007 | 934 | ZEUS | CORKY | UDP | CONTINUATION ID=28486 | |
| 127 | 0.0031 | 154 | CORKY | ZEUS | NFS | C F=E113 READ 4096 AT 13488128 | |
| 128 | 0.0025 | 1514 | ZEUS | CORKY | NFS | R OK (4096 BYTES) | |
| 129 | 0.0013 | 1514 | ZEUS | CORKY | UDP | CONTINUATION ID=28487 | |
| 130 | 0.0009 | 1278 | ZEUS | CORKY | UDP | CONTINUATION ID=28487 | |
| 131 | 0.0022 | 154 | CORKY | ZEUS | NFS | C F=E113 READ 8192 AT 5603328 | |
| 132 | 0.0026 | 1514 | ZEUS | CORKY | NFS | R OK (8192 BYTES) | |
| 133 | 0.0012 | 1514 | ZEUS | CORKY | UDP | CONTINUATION ID=28488 | |
| 134 | 0.0013 | 1514 | ZEUS | CORKY | UDP | CONTINUATION ID=28488 | |
| 135 | 0.0011 | 1514 | ZEUS | CORKY | UDP | CONTINUATION ID=28488 | |
| 136 | 0.0012 | 1514 | ZEUS | CORKY | UDP | CONTINUATION ID=28488 | |
| 137 | 0.0007 | 934 | ZEUS | CORKY | UDP | CONTINUATION ID=28488 | |
| 138 | 0.0057 | 154 | CORKY | ZEUS | NFS | C F=E113 READ 8192 AT 13664256 | |
| 139 | 0.0026 | 1514 | ZEUS | CORKY | NFS | R OK (8192 BYTES) | |
| 140 | 0.0013 | 1514 | ZEUS | CORKY | UDP | CONTINUATION ID=28489 | |
| 141 | 0.0013 | 1514 | ZEUS | CORKY | UDP | CONTINUATION ID=28489 | |
| 142 | 0.0012 | 1514 | ZEUS | CORKY | UDP | CONTINUATION ID=28489 | |
| 143 | 0.0010 | 1514 | ZEUS | CORKY | UDP | CONTINUATION ID=28489 | |
| 144 | 0.0007 | 934 | ZEUS | CORKY | UDP | CONTINUATION ID=28489 | |
| 145 | 0.0055 | 154 | CORKY | ZEUS | NFS | C F=E113 READ 8192 AT 8429568 | |
| 146 | 0.0026 | 1514 | ZEUS | CORKY | NFS | R OK (8192 BYTES) | |
| 147 | 0.0013 | 1514 | ZEUS | CORKY | UDP | CONTINUATION ID=28490 | |
| 148 | 0.0013 | 1514 | ZEUS | CORKY | UDP | CONTINUATION ID=28490 | |
| 149 | 0.0011 | 1514 | ZEUS | CORKY | UDP | CONTINUATION ID=28490 | |
| 150 | 0.0012 | 1514 | ZEUS | CORKY | UDP | CONTINUATION ID=28490 | |
| 151 | 0.0007 | 934 | ZEUS | CORKY | UDP | CONTINUATION ID=28490 | |
| 152 | 0.0032 | 154 | CORKY | ZEUS | NFS | C F=E113 READ 8192 AT 8437760 | |
| 153 | 0.0027 | 1514 | ZEUS | CORKY | NFS | R OK (8192 BYTES) | |
| 154 | 0.0012 | 1514 | ZEUS | CORKY | UDP | CONTINUATION ID=28491 | |
| 155 | 0.0014 | 1514 | ZEUS | CORKY | UDP | CONTINUATION ID=28491 | |
| 156 | 0.0011 | 1514 | ZEUS | CORKY | UDP | CONTINUATION ID=28491 | |
| 157 | 0.0012 | 1514 | ZEUS | CORKY | UDP | CONTINUATION ID=28491 | |
| 158 | 0.0007 | 934 | ZEUS | CORKY | UDP | CONTINUATION ID=28491 | |
| 159 | 0.0034 | 154 | CORKY | ZEUS | NFS | C F=E113 READ 8192 AT 5586944 | |
| 160 | 0.0025 | 1514 | ZEUS | CORKY | NFS | R OK (8192 BYTES) | |
| 161 | 0.0012 | 1514 | ZEUS | CORKY | UDP | CONTINUATION ID=28492 | |
| 162 | 0.0013 | 1514 | ZEUS | CORKY | UDP | CONTINUATION ID=28492 | |
| 163 | 0.0011 | 1514 | ZEUS | CORKY | UDP | CONTINUATION ID=28492 | |
| 164 | 0.0012 | 1514 | ZEUS | CORKY | UDP | CONTINUATION ID=28492 | |
| 165 | 0.0007 | 934 | ZEUS | CORKY | UDP | CONTINUATION ID=28492 | |
| 166 | 0.0041 | 154 | CORKY | ZEUS | NFS | C F=E113 READ 4096 AT 10211328 | |
| 167 | 0.0024 | 1514 | ZEUS | CORKY | NFS | R OK (4096 BYTES) | |
| 168 | 0.0012 | 1514 | ZEUS | CORKY | UDP | CONTINUATION ID=28493 | |
| 169 | 0.0009 | 1278 | ZEUS | CORKY | UDP | CONTINUATION ID=28493 | |
| 170 | 0.0036 | 154 | CORKY | ZEUS | NFS | C F=E113 READ 8192 AT 16736256 | |
| 171 | 0.0026 | 1514 | ZEUS | CORKY | NFS | R OK (8192 BYTES) | |
| 172 | 0.0012 | 1514 | ZEUS | CORKY | UDP | CONTINUATION ID=28494 | |
| 173 | 0.0013 | 1514 | ZEUS | CORKY | UDP | CONTINUATION ID=28494 | |
| 174 | 0.0011 | 1514 | ZEUS | CORKY | UDP | CONTINUATION ID=28494 | |
| 175 | 0.0012 | 1514 | ZEUS | CORKY | UDP | CONTINUATION ID=28494 | |
| 176 | 0.0007 | 934 | ZEUS | CORKY | UDP | CONTINUATION ID=28494 | |
| 177 | 0.0027 | 154 | CORKY | ZEUS | NFS | C F=E113 READ 4096 AT 16752640 | |

FIG. 16C PRIOR ART

METHOD SIMULATING DATA TRAFFIC ON NETWORK IN ACCORDANCE WITH A CLIENT/SEWER PARADIGM

BACKGROUND OF THE INVENTION

1. Field of the Invention

The present invention relates generally to modeling and simulating the operation and performance of communications networks and distributed processing systems, and more particularly to methods for modeling the data traffic generated by the nodes of such networks and systems which improve the accuracy of the simulations.

2. Description of Related Art

The merging of computers and communications during the past two decades has led to explosive growth in computer communication networks and distributed processing systems. While the size and complexity of today's communication networks vary broadly, from networks of multiple processors on circuit boards or chips to global networks with thousands of users, the basic function of all communication networks is the same: namely, the transmission of information through a shared facility composed of switches, multiplexers, concentrators, processors and communication links. The sharing of resources among network users is governed by protocols, as well as management and control strategies.

The central issues in the design, implementation, and operation of communication networks are performance evaluation and trade-off analysis. The performance measures used to evaluate communication networks vary, depending on the type of network being analyzed and the application (e.g., military or commercial, voice or data, etc.). For military communication systems, the major performance requirements include network vulnerability and survivability in a stressed environment. For commercial communication networks, the most common performance measures for circuit-switched networks include probability of blocking, grade of service, throughput, and network efficiency. Throughput, delay, and resource utilization are the most important performance measures for store-and-forward-type commercial networks. Similar performance concerns govern the design of distributed processing systems.

There are a number of different types of network protocols and configurations for interconnecting computers with which those skilled in the computer networking art will be familiar. As an example of a computer network, one of the most popular distributed system architectures has at its core a hierarchical communication network structure like that shown in FIG. 1. This hierarchical network structure, called a Campus Area Network (CAN), consists of a high-speed (100 Mbps or greater) backbone, for example, Fiber Distributed Data Interface (FDDI), which connects to a number of lower-speed workgroup networks. Each of these workgroup networks, in turn, can be formed by hierarchically interconnecting a number of Local Area Networks (LANs), for example, 10 Mbps Ethernet or IEEE 802.3. Each workgroup network is used to interconnect the computers, workstations, and so on for a given workgroup. The backbone, then, allows data sharing and communication between the various workgroups.

This example of a CAN is configured to serve a very large and diverse community of engineering and administrative users. The network could eventually consist of a number of hierarchically connected LANs, each with a tree-shaped topology, as is illustrated in FIG. 3. These LANs can be, in turn, interconnected by an FDDI LAN. As can be seen from FIGS. 2 and 3, each station on the FDDI ring is an IEEE 802.3 bridge which is connected to a either a Multiport Transceiver (MPT), a 10-Base-T hub or an ethernet backbone. Any of these ethernet subnets supports up to ten connections to devices such as engineering work stations (ESW, W/S), personal computers (PC), and fileservers (FS, F/S), and so on—several hundred devices growing eventually to a few thousand.

There are also a number of protocols for interconnecting lower level processing functions of which those skilled in the art will be familiar, including the IEEE Futurebus+P896.1. An example of a multiprocessing system based on the Futurebus+protocol is illustrated in FIG. 4. It can be seen from the figure that such a system can in turn form the node for a larger communications network through a connection to a Local Area Network (LAN).

It is not difficult for those skilled in the art of computer networking to appreciate the magnitude of the problem of configuring an actual working system of the types described in FIGS. 1 and 4. The cost of complex communication network hardware and software, and of configuring an operational network, is not insignificant. In the past, unproven designs have frequently lead to unnecessary procurement and to the disruption of day-today network operations.

Current methods for evaluating the performance of networks include the use of direct measurement techniques, analysis through the use of mathematical models and actual simulation of the network. Direct measurement through the use of monitoring equipment attached to the network is time consuming and indicates performance for the existing network only. Predicting the impact on performance of the network when adding nodes or applications is unreliable in most instances. These tools can be used, however, for providing statistical data to construct simulation models.

Analysis of a network based on mathematical models can require many restrictive assumptions to develop manageable models; it is generally impossible to develop closed-form solutions except in idealized and often oversimplified cases.

Simulation of the operation of a particular network, however, can more easily incorporate empirical models and measured data and can be used to more accurately predict actual network performance, analyze trade-offs, and evaluate alternatives.

Network simulation can play an important role in the design, analysis and management of communication networks. Simulation results can be used to evaluate and optimize network performance. Typical performance measures computed via simulations are system throughput, average response time, resource utilization, blocking and loss probabilities, recovery time after failures and other parameters associated with the transient response of networks. These results can be used to evaluate network design alternatives at component and architectural levels, predict performance before purchasing and trying components, and generate configuration and performance specifications for procurement.

Simulation can also play an important role in network management. A network manager needs tools to predict changes in network performance due to changes in network traffic, topology, hardware and software. The manager needs a tool to provide answers to "what if" scenarios, assist in planning for capacity changes, load balancing, building network survivability scenarios, and anomaly investigation. Rather than experimenting with the actual network, the manager can use simulation tools to evaluate alternate strategies for network management.

To simulate the operation of a network architecture such as the CAN example shown pictorially in FIG. 2 and schematically in FIG. 3, a model must be specified which represents this network in its entirety. Some level of abstraction and aggregation of constituents is typically incorporated where possible to reduce complexity of the model. The simulation then actually exercises the model through the imposition of discreet events to which the model reacts.

The simulation technique typically used to evaluate network performance is discrete-event simulation. In discrete-event simulation, various components of the actual network under study (communication links, buffers, access strategies, network control structures) are represented by models in a computer program. The events that would occur during the actual operation of the network (arrival, transmission, routing and departure of messages; error conditions such as message loss or corruption; link/node failures and recovery) are mimicked during the execution of the program to actually exercise the models.

The functions of the simulation program are to generate events to which the models respond. The response of the models simulate the network's response. The simulation program also gathers data during the simulation and computes performance measures. Clearly, the more accurately the models mirror the constituents of the network, the more accurately they will model the response of the actual network to the above-listed events. It should also be clear, however, that the accuracy of the simulation also depends upon how accurately the events of the real network are mimicked in exercising the models.

The fundamental approach to modeling distributed processing systems and communication networks is essentially the same. A network engineer is concerned with the flow of "packets" of information, and network performance is usually measured in terms of delay, throughput, and utilization of communication resources such as trunks. The designer of a distributed processing system, on the other hand, is concerned with the flow of "jobs" or "transactions" in the system, and the performance of the system is measured by throughput, average time for completion, and utilization of computer resources such as CPU's, disks, and printers. In both cases, the designer is clearly dealing with a discrete-event system, and the focus is on allocating resources (trunks, CPU's, etc.) to multiple entities (users, processes, jobs, or transactions) in such a way that performance objectives are met within the resource constraints. Thus, although the description of the present invention will be provided in its application to higher level communications networks, those skilled in the art will readily recognize the equal applicability of the present invention to distributed processing systems.

Network simulation tools, such as BONeS ® (block Oriented Network Simulator) sold by Comdisco Systems, Inc., are commercially available for use in network design, analysis, and management in order to minimize the risk of deploying such a network. The BONeS ® product and the manuals available to the public are herein incorporated by reference.

These simulators provide standard and user-defined models of the behavior of the various constituents of a network such as the one illustrated in FIGS. 1–3, including models of data traffic which are produced at each node of a given network and which provide the discrete events that drive the simulation.

The BONeS product also models the physical form (i.e. data structure) in which the data travels through the network. The data in a network typically travels from one node to another in the form of packets. Data packets include the binary data comprising the actual message being sent, but typically include additional overhead data added to the packet by the network to facilitate message routing, addressing and error detection. The exact structure of a packet will vary according to the particular network protocol being employed.

Network protocols vary according to particular suppliers, but most are structured as a layered set of protocol functions, with well-defined interfaces between layers. Each layer performs a distinct function and the implementation details for any layer are transparent to layers immediately above and below, and each layer communicates across the network only with its corresponding peer layer at other nodes.

The Open System Interconnection (OSI) model was developed in 1984 by the International Standards Organization (ISO) to provide a framework for the standardization of network protocols (Document Reference ISO 7498-1984). A description of this-seven layer model is shown in FIG. 5. Each packet originates in the Application layer (Layer 7) and the original message is further encapsulated with additional data to accomplish the function of the next layer.

The BONeS ® Designer ™ model of a network is specified by a hierarchical block diagram, which represents the flow of packets, messages, jobs, or transactions. FIG. 6a shows a simple BONeS ® Designer ™ block diagram of a two-node communication system, consisting of four blocks: two Traffic Sources, a Transmission System, and a Destination Node. This is a simple example intended to illustrate the use of such a simulation product. The Voice Traffic Source is a hierarchical block, composed of several component blocks as shown in FIG. 6b. The blocks in FIG. 6b generate packets with a uniform arrival rate and then set the Time Created field of the packet to the current simulation time, the Length field to the value of the Voice Packet Length parameter, and the Priority field to a value of 1. The packets which exit the voice source represent the packets which would be generated by a synchronous source such as digitized voice. The Data Traffic Source, shown in FIG. 6c generates traffic with Poisson arrivals and exponentially distributed lengths, representing a statistical model for data traffic produced by a particular node on the network. Outputs from the two sources are merged and passed on by the Transmission System.

The data structure representing the packet can be tailored for each type of data traffic produced (i.e. priority, length of packet, etc.). The data packets can be stamped with the time they are created by the source and with the time received by the packet destination. By comparing time stamps, delays can be computed. By adding the packet lengths of all packets transmitted by the system, throughput can be calculated. The values for the time the packet was created, priority and packet length are inserted into the data structure by the middle blocks in FIG. 6b, and the other time stamps (e.g. arrival time) are inserted as the packet passes through various points in the system.

It should be pointed out that the data structures of packets flowing through an actual network do not have fields for time stamps, and have actual lengths and therefore do not require a field to represent message length. The time stamp fields of the data structure are used for purposes of creating a record of the flow of the packet through the system during the simulation. The network protocol is modeled through use of the message length, which accounts for any encapsulation of packets as they move through the system.

The middle block in FIG. 6a represents the Transmission System. It queues up the packets coming out of the source, allocates trunks for transmission on a priority basis, and releases packets to the destination node after a time delay, which represents transmission time. The Transmission System block is hierarchical, built with BONeS ® Designer TM library models for queues and resource allocation.

The total transmission delay is computed within the Transmission System block as the sum of the propagation time and the transmission time, which is equal to packet length in bits divided by trunk capacity in bits per second. Note that it is not necessary to actually generate the individual bits that are transmitted over the link. It is necessary only to compute the time required for transmitting a packet, which is a function of only the packet length and not the content.

The Destination Node time-stamps the received packets and puts them into a sink. By averaging the difference between the time at which the packet was received and the time at which the packet was created, the average overall delay can be computed. By repeating these simulations for different traffic loads, a typical delay vs. load performance plot for the network can be produced.

Additional traffic sources, representing additional nodes, can be added by simply adding additional traffic source blocks to the system block diagram shown in FIG. 6a. Alternatively, traffic characteristics can be modified by changing parameter values or by creating completely new traffic source blocks.

Further specific information regarding the BONeS ® network simulator may be found in the BONeS ® Designer TM Introductory Overview, the BONeS ® Designer TM User's Guide, and the BONeS ® Designer TM Modeling Guide. All of the publicly available products, manuals and supporting documentation are hereby incorporated herein by reference and have been published by Comdisco Systems, Inc.

Traffic Models used in simulators, such as the two models employed for the Voice Traffic Source and Data Traffic Source in the above example, are typically based on some statistical model for the message size and the time between generated packets. In the example above, the Voice Traffic Source model specifies a uniform arrival rate and a fixed packet length. The Data Traffic Source model specifies traffic with Poisson arrivals and packet lengths which are exponentially distributed. The problem with these models is that they are at best gross approximations of the kind of data packets which will be generated by a particular node at any particular time under particular network load conditions.

Each network node can be comprised of a different computer system configuration, having its own resources and running its own designated applications programs. For example, one node can be a personal computer (PC) which has a 20 Megabyte hard drive, an 80386 3CPU, disk drive and various other resources. This node may be dedicated to running various applications such as spreadsheets, wordprocessing, document administration, etc. Another node may be comprised of an engineering workstation, capable of running powerful circuit simulation applications which may involve traffic intensive video or graphics display functions. Still other nodes may be dedicated as file servers and could be large IBM or DEC minicomputers with large disc storage, or they could just comprise a personal computer.

The data traffic generated by each of these nodes will be radically different and will be a function of the application programs being executed by the node, the quality and quantity of the resources available at the node, the current demand on the node resources and the response times of other nodes from which they may request data. As previously discussed, the accuracy of any simulation will critically depend not only on the accuracy of its models for network constituents, but also on the models for the generation of the discrete events which exercise those network models.

In order to render more accurate models of the traffic generated by the nodes of a particular physical network, traffic analyzers have been employed to record actual data traffic on the network. Long samples can be used to create statistical models for the traffic characteristics of the particular network, and these models are then used in simulators to drive network models. Short samples have also been used to create traces which are used to recreate the exact pattern of traffic as recorded from the physical network. These traces are read by traffic generators to generate a repetitive output, used to drive the network models in simulation, which mimics the recorded traffic pattern.

There are still many accuracy problems associated with these approaches. First, a snapshot of data traffic on a network at any particular time will vary widely from a snapshot taken at any other time. Thus, generating a small, repetitive segment of measured traffic remains extremely inaccurate. Further, although statistical data gathering over a long period of time may be relatively more accurate, the peaks and valleys of activity on the network will be lost and thus those combinations of activities which may cause problems temporarily may not be ascertained.

Most importantly, the traffic models developed in the above-described manner are only for a particular physical network configuration as sampled. The characteristics of the traffic generated by each node on a network will change as the load on the network increases or decreases, as resources are altered at a particular node, or new applications are installed at existing nodes. Thus, if the reason for running a simulation is to determine what would happen to network performance if the number of nodes is increased from the existing ten nodes to twenty, the emulation of traffic using samples from the actual network with ten nodes no longer is valid.

Although one could attempt to extrapolate the relationship between each additional node and the resulting impact on performance, this would be inaccurate and is exactly what one is attempting to determine accurately through simulation in the first place. Thus the most attractive and beneficial reason to use simulation products, the desire to evaluate and predict performance of the network as load, resources or applications are varied without the need to actually configure the system, is defeated by the inability of current traffic models based on an existing network to alter their characteristics as a function of these variables.

The present invention provides a method for modeling traffic which is based on sampled traffic for an existing network but is not fixed as the number of nodes, nodal processing resources and applications run by each node are altered. Rather, the method of the present invention provides traffic models which are based on sampled traffic for a real system but which alter their characteristics as a function of the above-described variables and thereby render more accurate predictions of network performance.

The method of the present invention recognizes that networks and distributed processing systems operate in a mode which typically involves a request message generated by, and transmitted over the network from, a node connected to the network to another node residing somewhere else on the network. The receiving node then processes the request and issues a response, transmitted over the network and back to the requesting node. Quite often, the requesting node's next request is dependent on receiving the response and may also possibly depend on the nature of the response. Of course, some messages may not be in the form of a request or a response to a request, but they may initiate action by other nodes once received or they may be completely uncorrelated to any other messages.

Most networks today comprise a series of client nodes and a relatively smaller number of server nodes. The client nodes are those which run applications programs locally and must access large data bases for the data on which to operate. The server nodes are designed to maintain the data bases to which the clients desire access and provide the clients with copies of portions of these data bases in response to their requests.

The time necessary for a client node to formulate a request will depend upon a number of factors, such as the type of application(s) being run, the contention for the local node's processing resources, the speed of those resources, the time to receive the response to a previous request if the current request is correlated to the response, and even the time for an operator to think and type.

Likewise, the time for a server node to formulate a response once a request has been received will depend on the demand and contention for its resources (which is often directly a function of the number of client nodes it must serve), the types of applications that the client nodes are running (which will govern the size, complexity and frequency of required responses), and the speed and power of its available resources.

Of course, the size of the packets which comprise the requests and responses will also impact request and response times because the network topology and protocols will impose limitations on the network with respect to transmission time between nodes. This aspect of the system will be reflected in the models of the network topology (i.e. the number of nodes and links), the network data structures, the network resources (i.e. buffers, trunks, buses, CPU's and switches) and the network protocol functions (i.e. which govern the flow of packets in the protocol layers and allocation of resources).

Thus, it is the object of the present invention to model the characteristics of traffic generated by each client node which vary as function of the applications run by the node, the resources available to the node and the contention for those resources, the response times which govern the initiation of its requests and the processing time required to issue such a request.

The method of the present invention accomplishes this objective by modeling the traffic generated by a client node in accordance with the Client/Server Paradigm illustrated in FIG. 7. This model is specified using the four basic parameters described in FIG. 7: Client Waiting Time, Client Request Size, Server Response Time and Server Response Size.

As illustrated in FIG. 7, the Client Waiting Time is the time between the arrival of the last server node response packet and the transmission of the next client request packet. This time represents operator thinking time, typing time, and the time necessary for the local processor at the client node to evaluate the server response (if the response and the next request are correlated) and to process the next client request for transmission. The local processing time will be a function of the speed of and contention for its resources. The Client Waiting Time will also be a function of the application(s) being run on the client node and the particular operation of that application involving the request.

The Client Request Size is the size of the request packet and will also be a function of the application and the particular operation being executed. The Server Response Time is the time between the arrival of the client request packet at its destination node, and the time the server node transmits a packet in response to the client request. The Server Response Time is a function of the resource contention, application and operational circumstances as previously discussed. The Server Response Size is the response packet size and is also a function of application and operation.

It will be obvious to one of ordinary skill in the art that the method of the present invention can be applied to modeling the transaction traffic of distributed processing systems as well. Distributed processing systems are similar in that usually a number of local processors with their own local memory run local programs and operate on data imported from a few large memory sources. The processors run their programs until they require data which they don't have locally and initiate a transaction out over a shared bus to request the data from the shared memory source. The shared memory then issues a response to the local processor's request. Access to the bus, the size and form of the transactions, as well as data consistency are governed by the bus protocol and impact request and response time. The speed of requests and responses will also be impacted by the speed and contention for the associated processing resources, as well as the type of applications being run on the local processors.

SUMMARY OF THE INVENTION

The present invention is a method for modeling the traffic generated by the nodes of a communications network or distributed processing system, based on the known or measured request/response interactions between a client node and a server node as the client node runs a particular application or multiple applications with no other load on the network. A simulation model of this interaction is created as a function of four parameters comprising a Client/Server Paradigm. Using the model, discrete events mimicking the data traffic which flows over the network between the client and server nodes with no other traffic on the network can be generated. The constituent resources of the network can be modeled, and the response of the network can be predicted by simulating the model with the traffic generated by the model.

The response of the network to increasing the number of client nodes can be predicted by increasing the number of sources generating the modeled traffic for the simulation. The nature of the traffic model is such that as the overall response predicted by the network model during simulation changes as a function of the change in the amount of traffic competing for the network resources, the change in network response is fed back to the traffic sources which alter the characteristics of the traffic they are generating in response thereto. Thus, the model for the traffic between a node running an application on a network and a server node may be developed with no other load on the network, and the model will automatically alter the traffic it generates so that the appropriate traffic will be generated under various load conditions. The change in load can be the result of increased traffic, but can also be the result of changes in the amount or quality of the network resources available to handle the traffic load.

The traffic models developed in accordance with the method of the present invention produce more accurate network simulation results because as the number of client nodes on a physical network increase, the time between packets generated by the client nodes would begin to increase as the overall response by the network to their requests slows down.

Nodal traffic modeled after the Client/Server Paradigm not only predicts the increase in request packet interarrival times as the network response slows, but also accounts for contention for both client and server node resources. As the number of client node requests increases, the resources of the server node can eventually be exceeded and the requests must be queued. For the client node, the demand for resources can vary as a function of the application it is running. In a addition, client nodes running multiple applications will experience contention for resources in a manner similar to the server node. All of these variables are accounted for and their effects predicted by the traffic model produced according to the present invention.

Of course, simulations may be run which specify networks with multiple nodes running different applications by simply modeling each node configuration running a different application or applications in the manner described above, and simply provide traffic source models in the simulation for each different node on the network to be simulated.

Thus, the method of the present invention greatly improves the accuracy of simulations of the operation and performance of a network as the number of nodes, the quantity or quality of processing resources resident at each node, the quantity or quality of network resources and/or applications run by each node vary. The method is fully adaptable to currently available network simulation products.

The traffic generated at each client node is modeled after a Client/Server Paradigm. That is, the traffic is modeled as a request and an ensuing response. This model is specified using four basic parameters: Client Waiting Time, Client Request Size, Server Response Time and Server Response Size.

The Client/Server Paradigm is applied to model the traffic conversation generated between each network client node and server node according to the application run at the node and the resources used to run it. If more than one client node runs the same application(s) using identical resources, only one model need be created which can then be duplicated for the simulation according to the number of identical client nodes.

The model can be created through known characteristics of the client/server interaction for a particular application. It can also be developed by first, applying a network analyzer or network management system to an actual network. Traces are taken of the network traffic generated by the client node while running the application of interest, with the server node running on the same segment of the network. No other nodes should be accessing the server and a minimum of background activity should be present on the network.

The resulting trace should be examined to determine the pattern of request/response traffic between the client and server over the network. Information indicating Client Waiting Time, Client Request Size, Server Response Time and Server Response Size should be extracted from the trace for each request-response step of the traffic pattern to be modeled.

Finally, the four parameters can be incorporated into a script format which can be converted by a commercially available traffic generator into discrete events which will drive the network models of the simulator. The script developed according to the method of the present invention will cause the traffic generator to delay generating a client request packet which is dependent upon or correlated to receiving a response packet from a remote node. Thus, as response time increases as a function of network load and performance, the traffic generated by the traffic sources is adjusted accordingly.

The script developed in accordance with the present invention will also take into account the speed and contention for server resources through the Server Response Time parameter, and takes into account the speed and demand for client node resources through the specification of the Client Waiting Time parameter.

Thus, the present invention provides a model for network traffic which is viewed from a client node and which automatically adjusts the model when variations are introduced with respect to the particular applications being run by the client nodes, the demand on resources local to each node which can create contention, the speed with which those local resources can operate, the time necessary for operators to respond to previous responses and the demand for those server node resources.

These models will therefore alter the characteristics of "conversations" between nodes over the network not only based on the characteristics of the network itself, but also as a function of the particular applications currently run at each node, the resources available to run them and the demand on those resources as the number of nodes or the applications running on those nodes are varied. The present invention therefore provides an accurate picture to a network designer or manager attempting to simulate the effects on performance of a given network when the number of nodes are increased or decreased, or when the addition or substitution of computing resources or the introduction of different or additional applications is made.

FIG, 2 is a-pictorial representation of a Campus Network.

Figure 2:
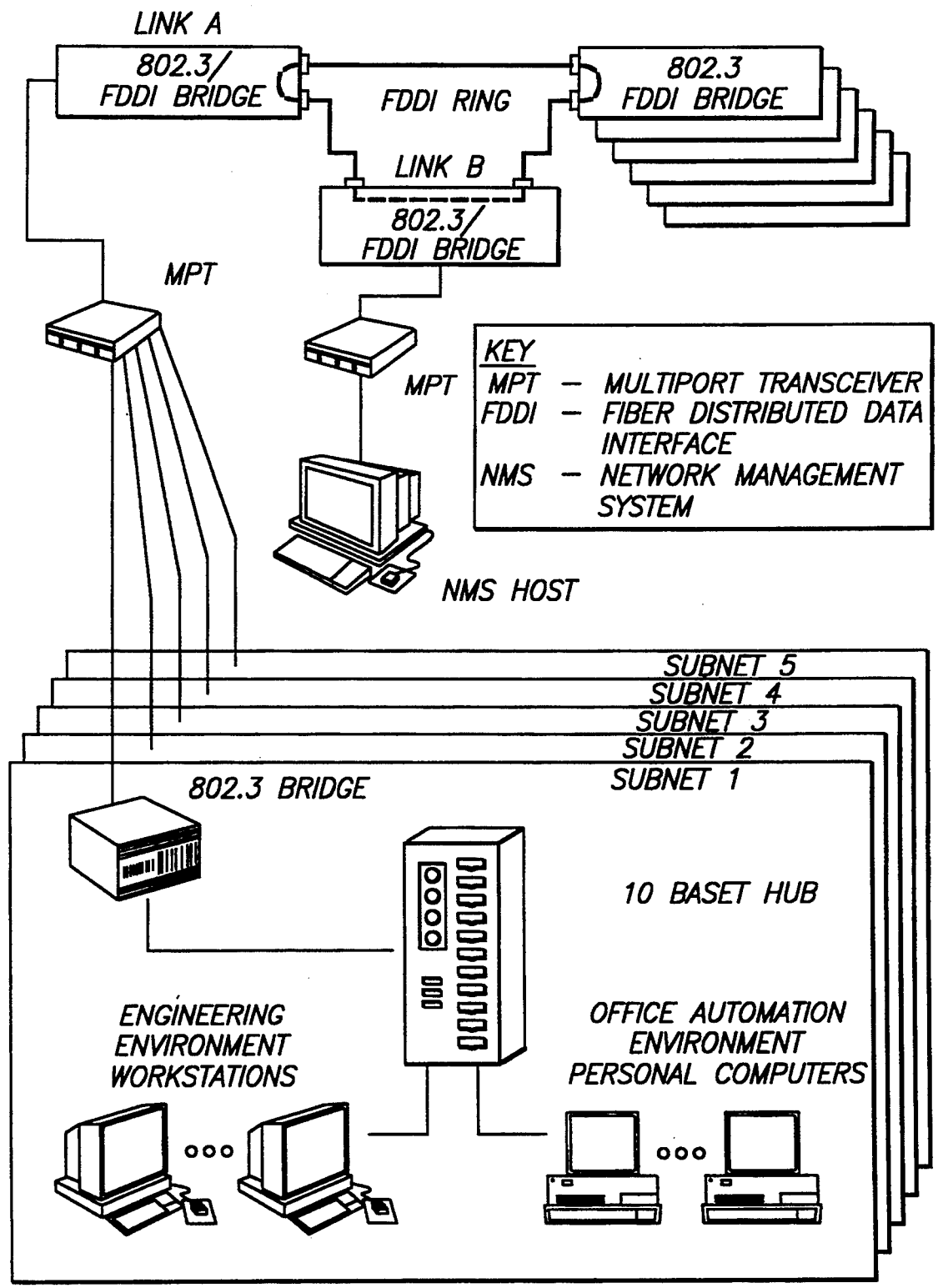
Figure 3:
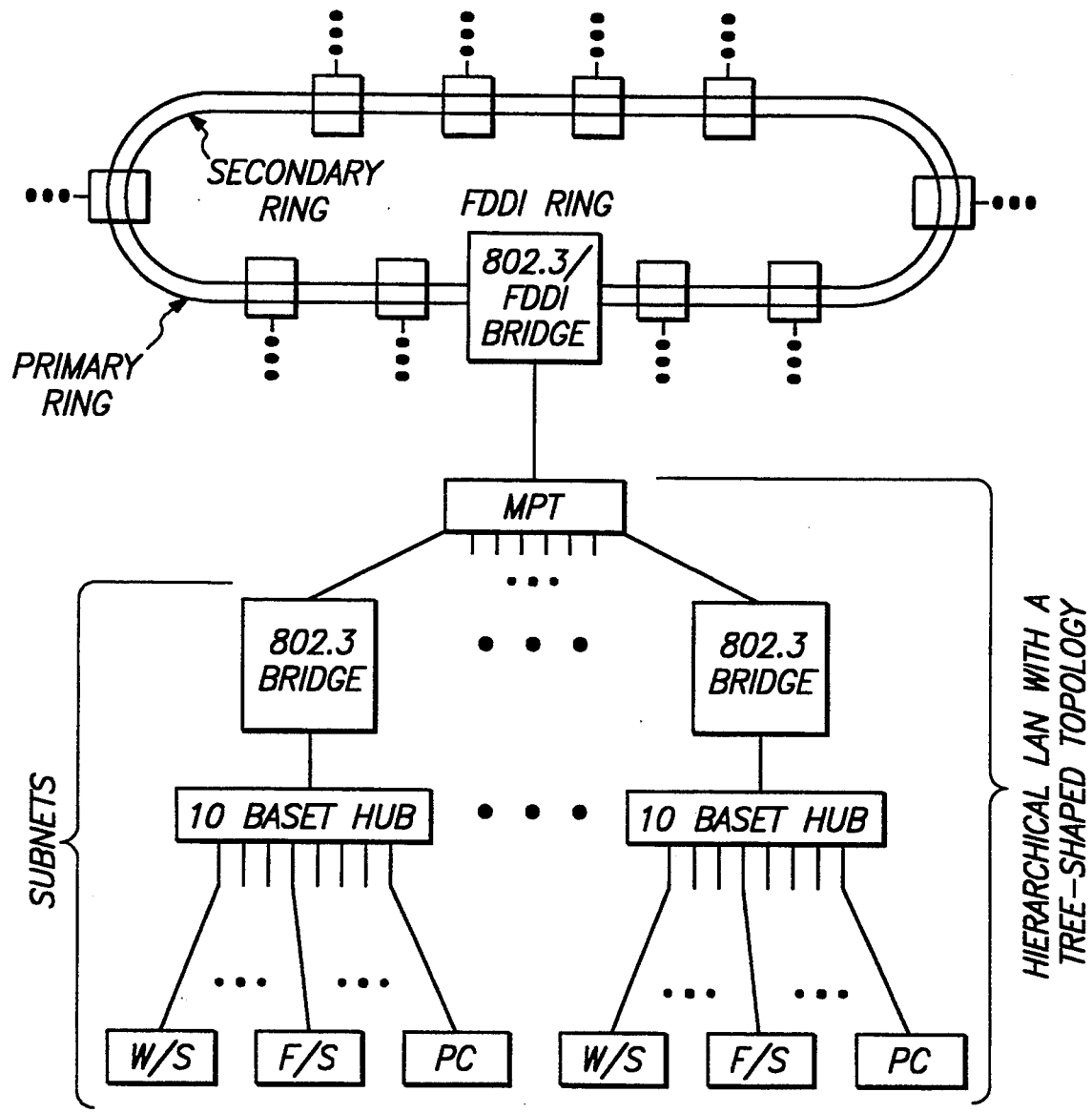

FIG. 3 is a schematic representation of the a Campus Network of FIG. 2

Figure 4:
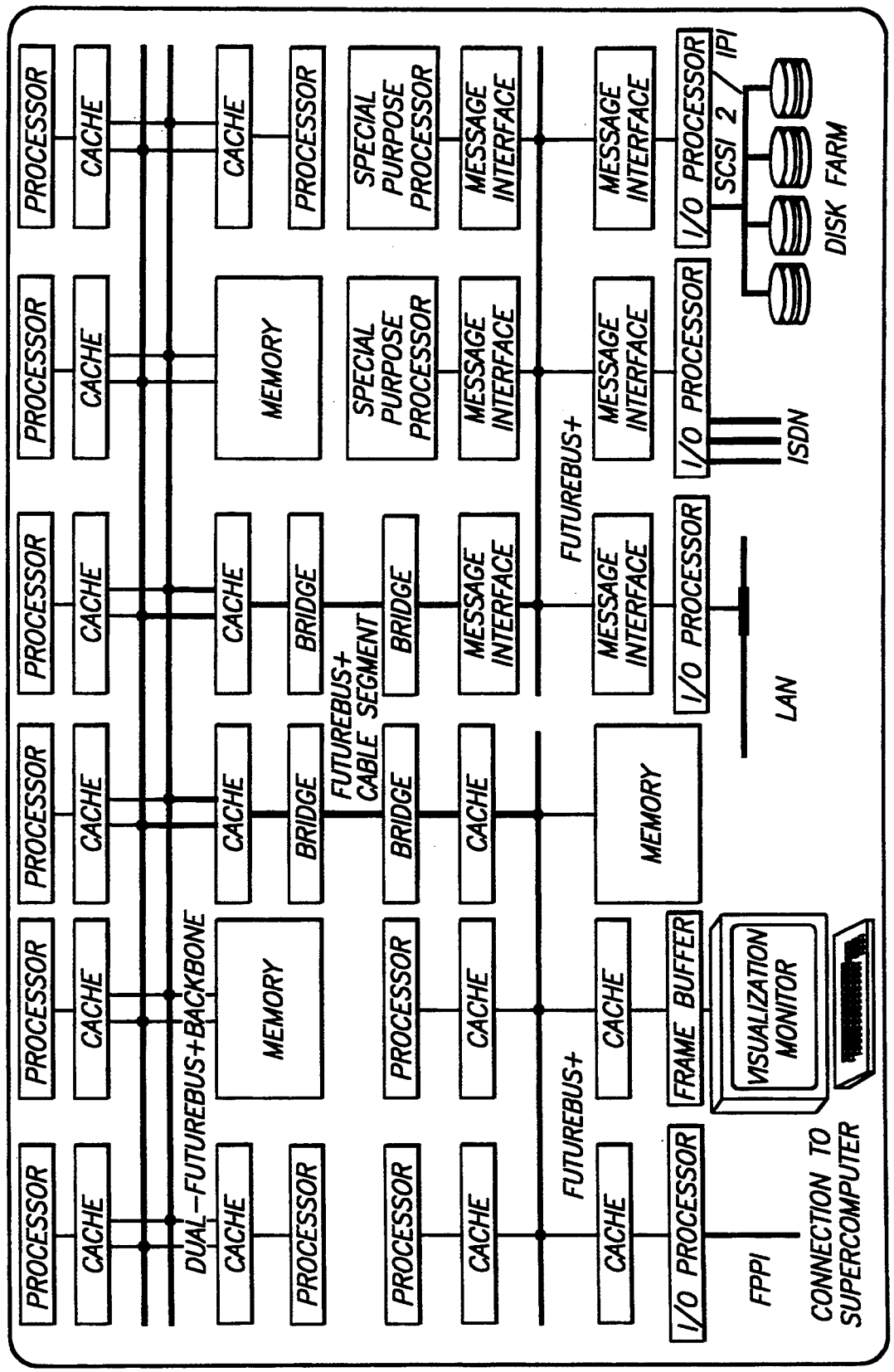

FIG. 4 is a high level block diagram of a distributed processing system.

FIG. 5 is a description of the ISO Open System Interconnection Model,

FIG, 6a is a block diagram of a transmission system simulation.

Figure 6A:
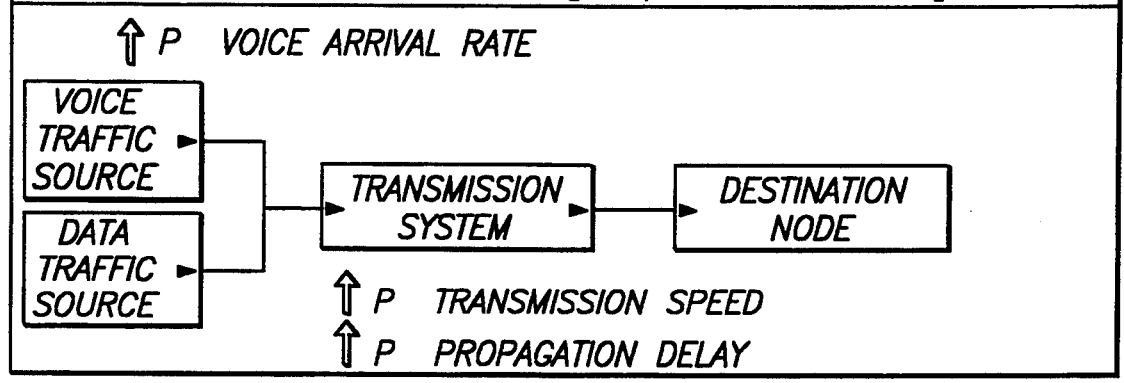
Figure 6B:
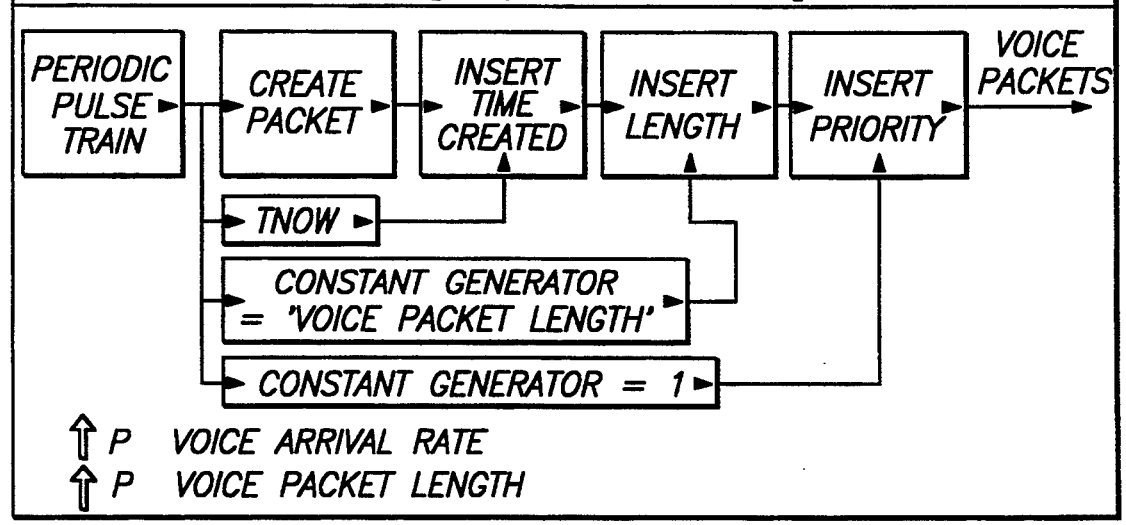

FIG. 6b is a block diagram of the Voice Traffic Source block in FIG. 6a.

Figure 6C:
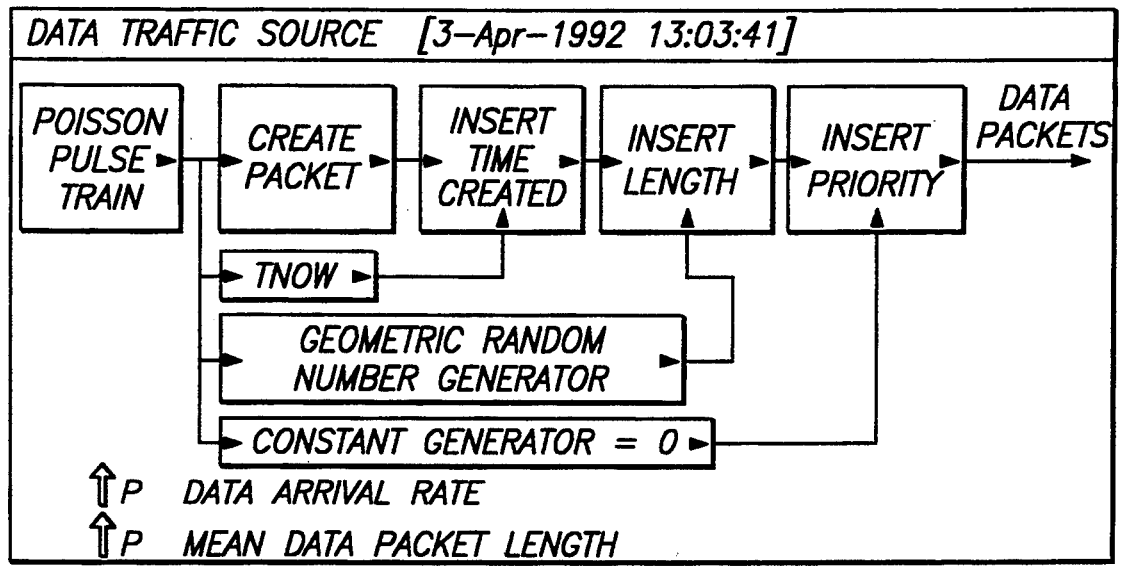

FIG. 6c block diagram of the Data Traffic Source block in FIG. 6a.

Figure 7:
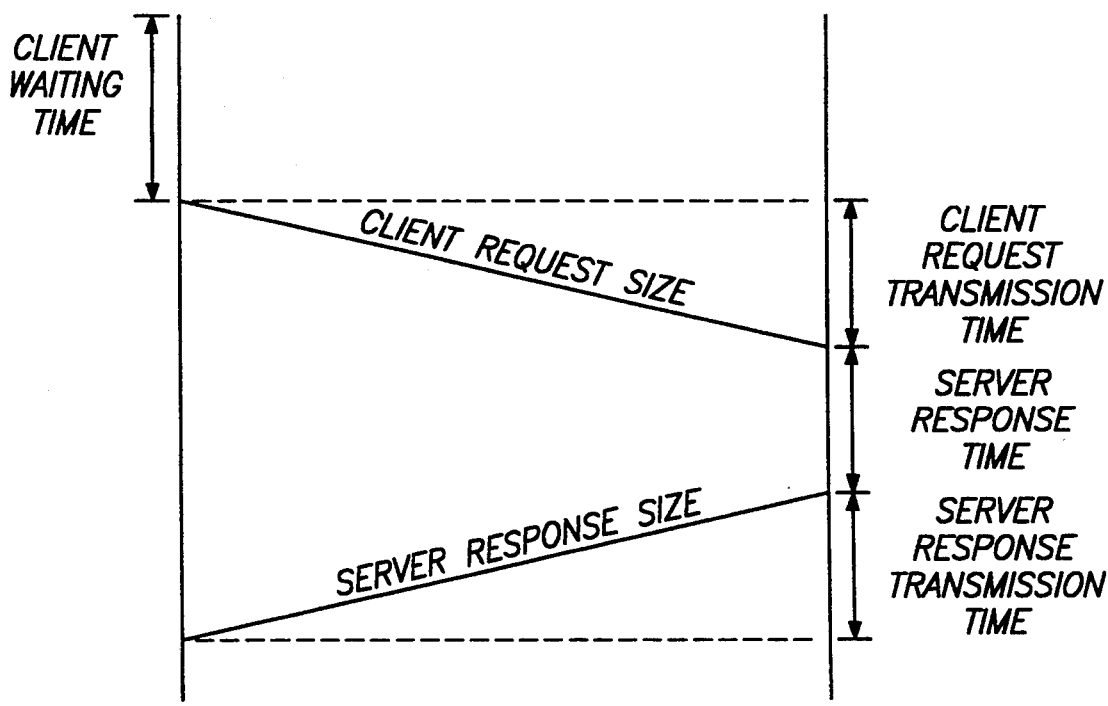

FIG. 7 is a conceptual drawing of the Client/Server Paradigm.

Figure 8:
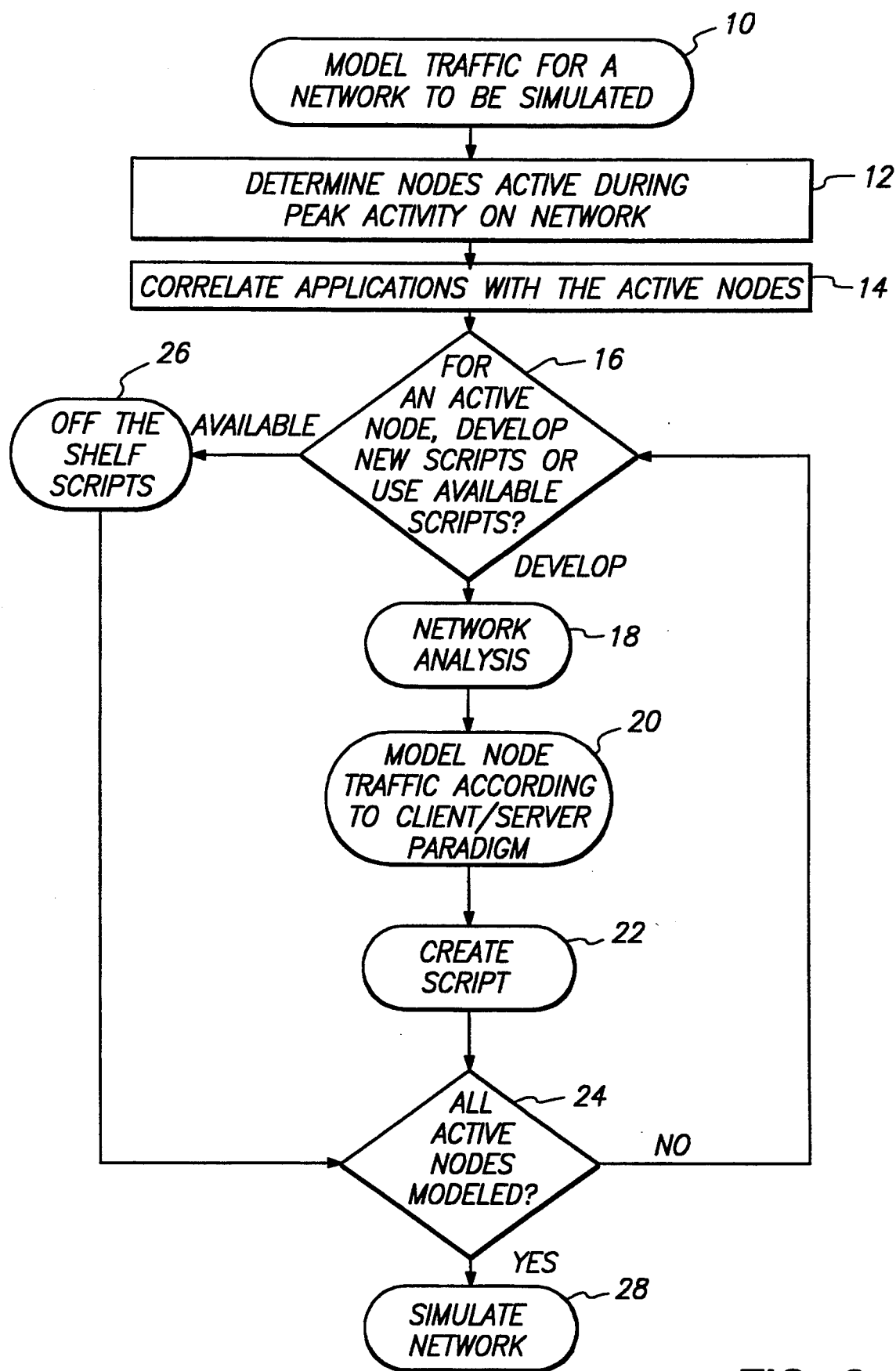

FIG. 8 is a flow diagram illustrating the procedure for modeling traffic for a network to be simulated.

Figure 9:
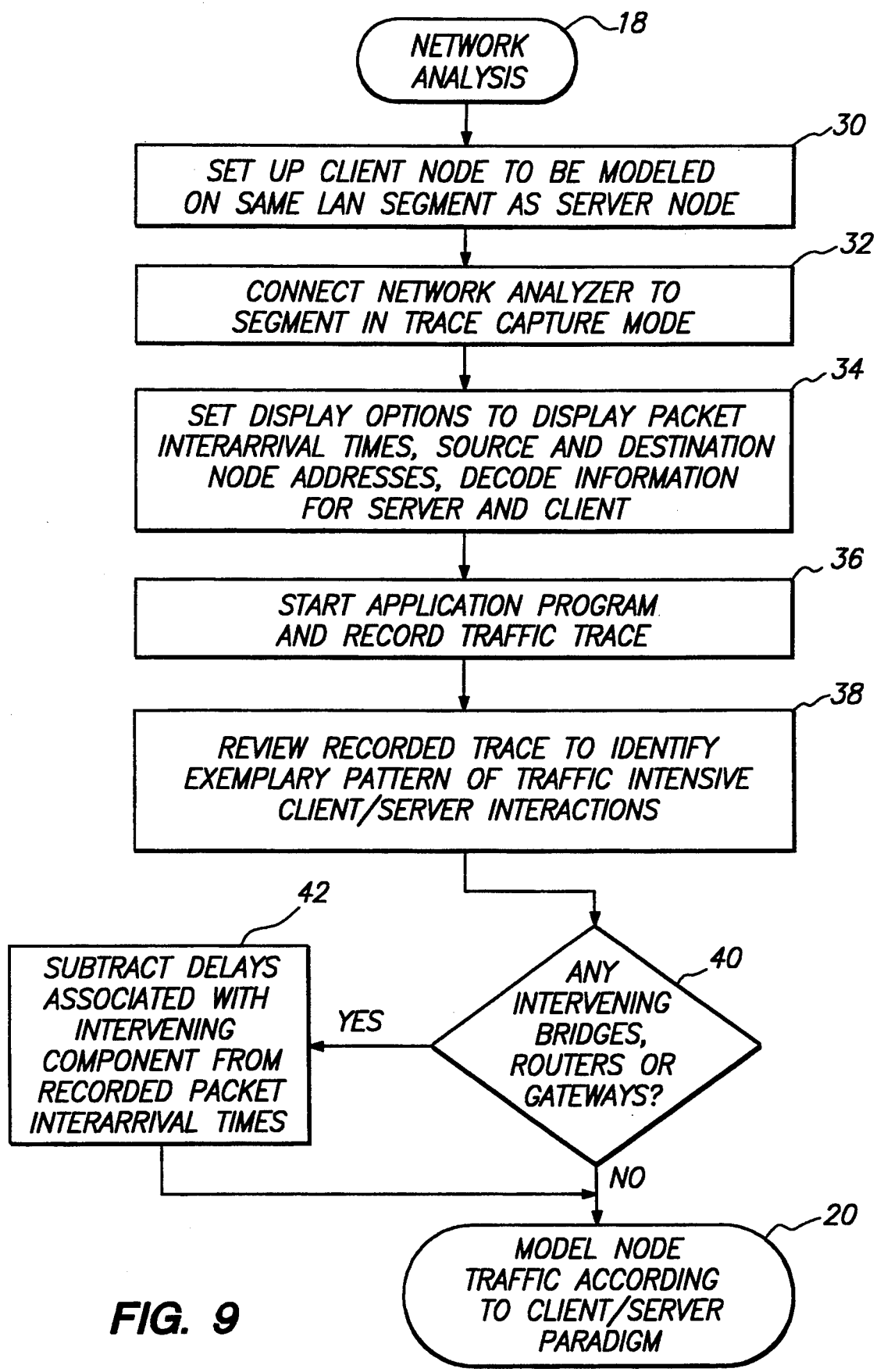

FIG. 9 is a flow diagram illustrating the procedure of performing network analysis.

Figure 10:
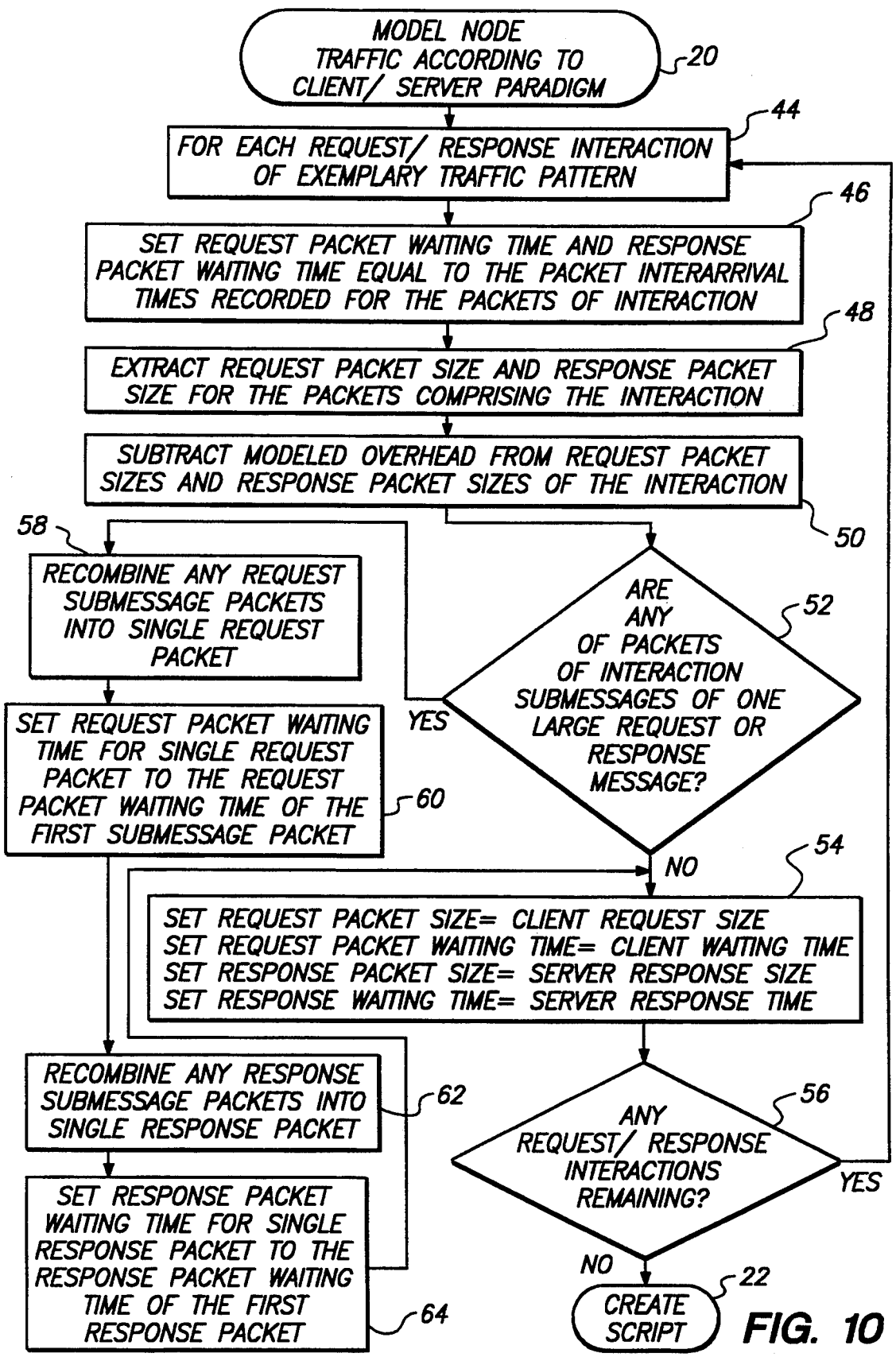

FIG. 10 is a flow diagram illustrating the procedure for modeling node traffic according to the Client/Server Paradigm.

Figure 11:
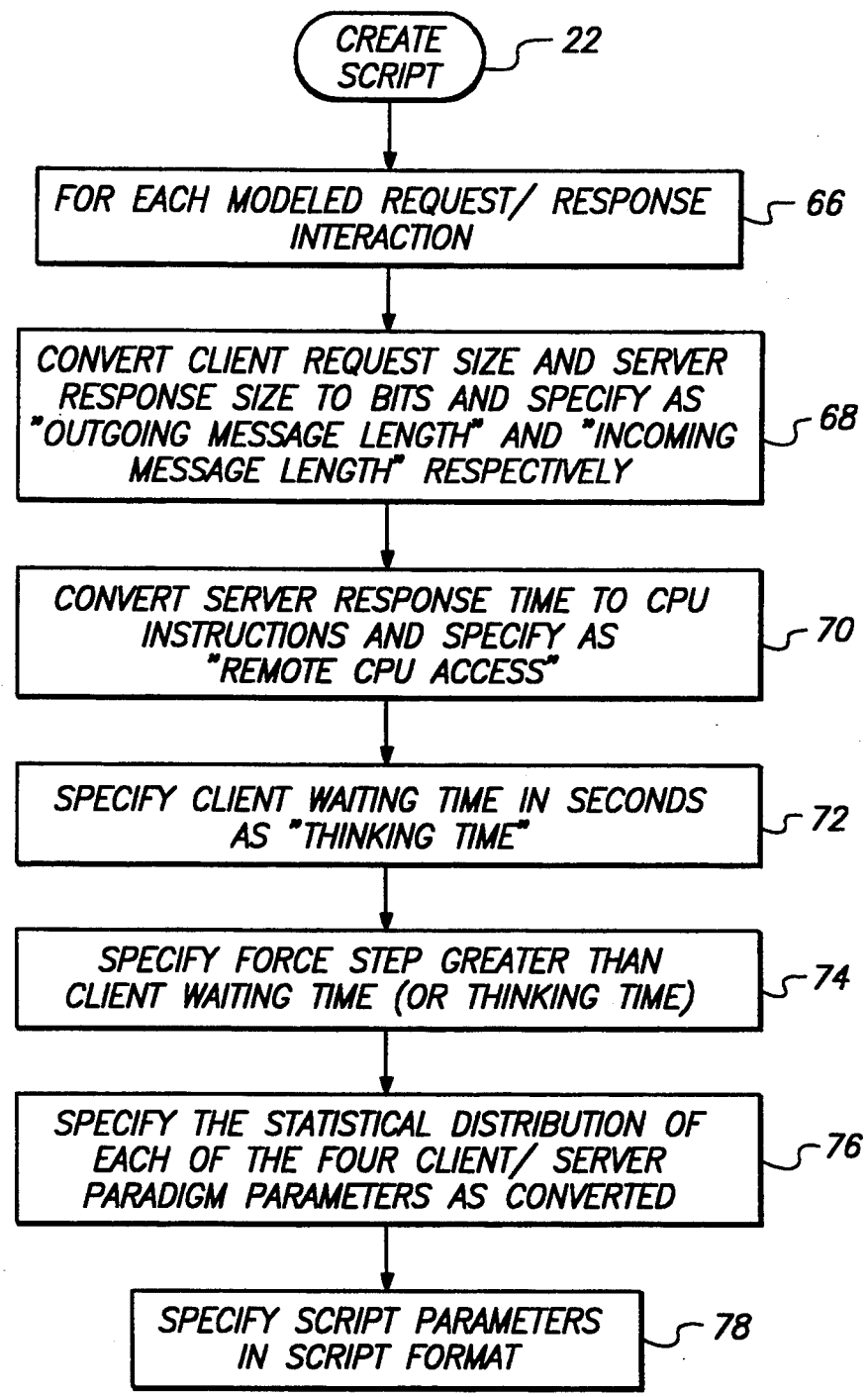

FIG. 11 is a flow diagram illustrating the steps for creating a script from the model parameters.

Figure 12:
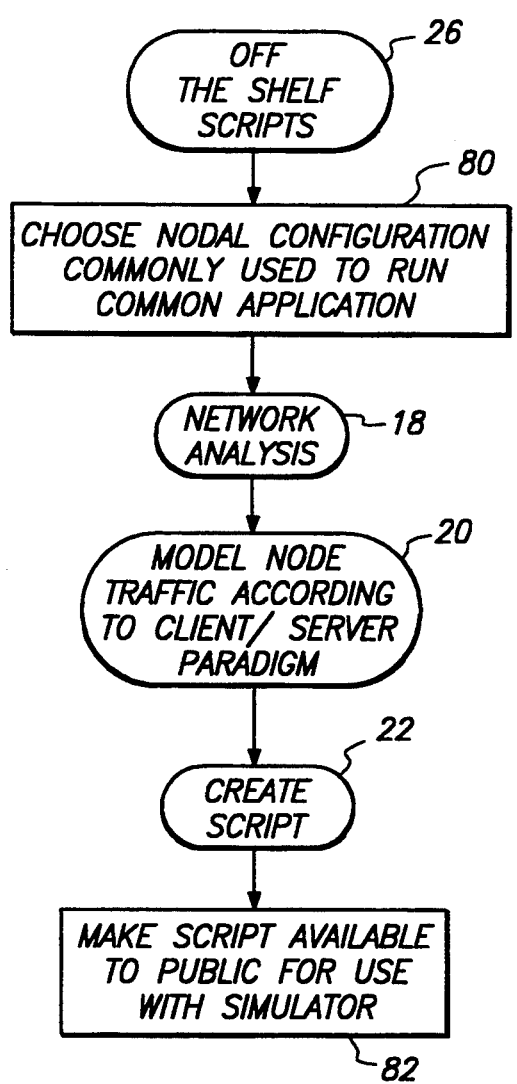

FIG. 12 is a flow diagram illustrating the procedure for providing scripts of common applications.

Figure 13:
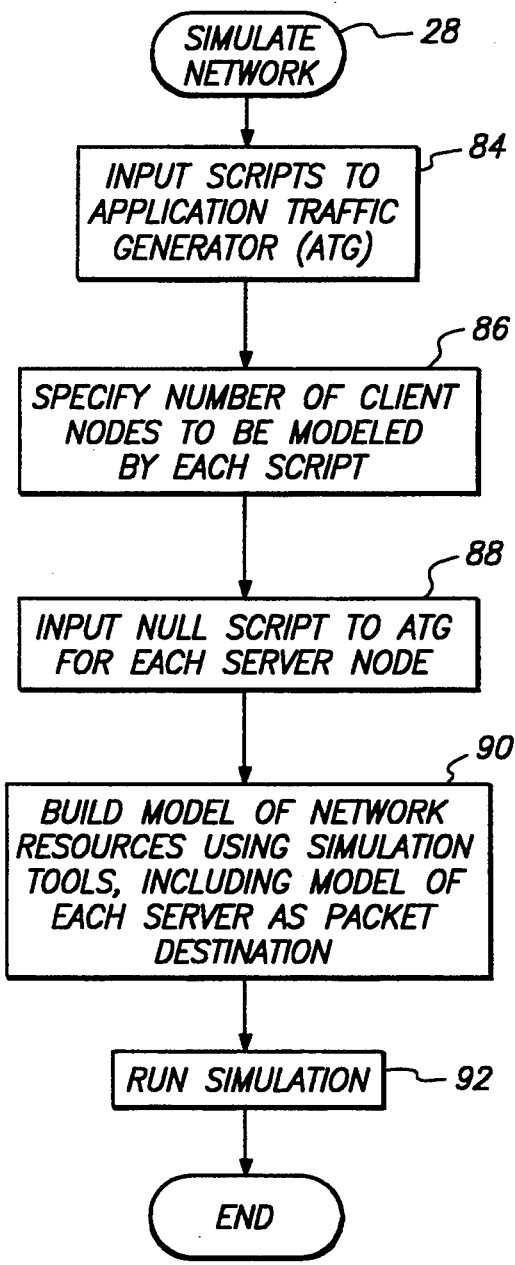

FIG. 13 is a flow diagram describing the procedure for using scripts in the simulation of a network model.

FIG. 14a is a script developed for the first example of how to apply the method of the present invention.

FIG. 14b is a script developed for the second example of how to apply the method of he present invention.

FIG. 15a is the first fifty-nine packets captured in the trace of the first example.

FIG. 15b is the second set of fifty-nine packets captured in the trace of the first example.

FIG. 15c is the third set of fifty-nine packets captured in the trace of the first example.

FIG. 16a, 16b and 16c illustrate the trace captured for the second example.

DETAILED DESCRIPTION OF THE INVENTION

As previously discussed the invention models the traffic generated by each client node, while running its particular application or applications, as a series of request/response interactions with a server node on the network. This modeling process should be performed without any other client nodes interacting with the server. The modeling process should also be performed for each node which either runs a different application or has a significantly different resource configuration. Once the Client Waiting Times, Client Request Sizes, Server Response Times and Server Response Sizes are determined for the series of operational client/server interactions of a particular application or set of applications run with a particular resource configuration comprising a network node, these Client/Server Paradigm parameters can be translated to scripts which can be translated by commercially available traffic generators to generate traffic in accordance therewith. One such traffic generator is the PlanNer Application Traffic Generator Module (ATG) available from Comdisco Systems, Inc. The ATG Module and the manuals available to the public are herein incorporated by reference. For further detail regarding the ATG, a detailed description of its use and operation is provided in Appendix A of this application. The discrete events from the traffic generators can then be used to exercise the network models in simulation thereof.

Traffic generated according to the Client/Server Paradigm of the present invention will behave in a manner which is more realistic than traffic generated by conventional traffic models. For those client node requests which are dependent on a response from the server, two conditions must be met before a traffic source modeled in accordance with the present invention will generate the request packet. First, the response packet must be received at the traffic source and second, the Client Waiting Time must be satisfied. If ten nodes identical to the one modeled in accordance with the present invention are added to a network model to simulate the impact of this addition on network performance, the increased traffic will slow down the overall system response time from the server to the client in accordance with the model of the network. The overall system response to a client request includes the Client Request and Server Response Transmission Times, which will increase as the traffic from the additional ten traffic sources contend for the network resources. Additionally, the overall system response time will increase because of the increased demand for the server node resources. The increase in client requests will cause those requests to be queued up as the server resource capacity is exceeded, and the server cannot respond until a request packet has actually been received by the server and the Server Response Time has been met. This increase in overall system response is predicted by the network model during the simulation. Because the traffic source cannot issue its next request packet until the response packet, to which the next request packet is correlated, is received by the traffic source (and until the Client Waiting Time is then also met), the effects of the increased traffic on network performance are in essence fed back to the traffic sources. The traffic sources will in turn increase the time between generation of client node packets. The traffic sources behavior models what would occur if ten nodes were added to a physical network.

Although it is possible to model every possible client/server interaction which arises in running a particular application in accordance with the present invention, this would be prohibitively time consuming and unnecessary. In determining network performance, the primary concern is with network operation under peak demand. Thus, as a practical matter, the traffic on a node is best modeled while the network is experiencing peak demand. Further, only the most data intensive client/server interactions need be modeled and used as inputs for a simulation.

Commercially available network analyzers or network managers can be used to determine when peak activity occurs on the network, which network nodes are active during the peak activity and what applications are currently being run by the active nodes. One such commercially available network analyzer is the Sniffer product line sold by Network General Corporation, 4200 Bohannon Drive, Menlo Park, California 94025. The Sniffer product and all manuals available to public are herein incorporated by reference. A detailed description of the preferred embodiment of the invention is now discussed in conjunction with FIGS. 8-16c.

FIG. 8 illustrates a procedure 10 for modeling traffic for the nodes of a network to be simulated. In the first block 12, the times of peak activity on the network system to be simulated should be determined. The number of active nodes (or stations) which are operating during these peak periods should be identified and should be correlated with the applications they are running during these peak periods as illustrated by block 14.

If the network to be simulated physically exists, obtaining the above information can be easily accomplished using a network analyzer (i.e. a Network General Sniffer), or a network management system. If the network is a hypothetical one, the worst case can be assumed in that all nodes or stations are active and they are running the most traffic intensive of applications concurrently.

Each different application should then be modeled according to the Client/Server Paradigm and represented in script format. As illustrated by decision 14, scripts can be developed, or if the application(s) run on a node and the resources used to run the application comprises a popular combination, scripts modeling the traffic produced by such a node may be commercially available. If the scripts are to be developed, the node on the network can be analyzed in accordance with the procedure 18.

Procedure 18 is illustrated in FIG. 9 as involving the following steps. Setup the network analyzer, the client station, and the server station on the same LAN segment, with no intervening bridges, routers, or gateways between them (Blocks 30 and 32). This should be done even if some or all of the client stations running the application being modeled normally access the server through an intervening network node. The presence of intervening network repeaters or hubs may be ignored, as their effects will be accounted for in the network model. Note that this may not be possible in all cases. One example might be if Apple Macintosh stations on AppleTalk access a file server on 10-Base-T, using a gateway node to establish access. In this case, the workstation should be operated across the gateway in the normal fashion, and the minimum latency of the gateway (the delay forwarding network packets), if known, should be subtracted from the trace packet interarrival times (Block 42). The effects of the gateway are subtracted from the traffic model because the effects of the gateway will be modeled by the network model.

There should be no other activity on the server, and the level of other activity on the LAN segment should be minimized. This is important to make certain that the Client/Server Paradigm parameters measured from the analyzer trace are those of the client and server running the application, and not other network components or other unrelated network activity.

The network analyzer should be set up in trace capture mode 32. If the analyzer has frame slicing feature to minimize the amount of information kept in the network trace buffer for each network packet, this may be used to maximize the length of the trace that may be saved and to maximize the trace performance of the analyzer. Some of the packet contents should be retained to preserve the protocol decoding of the packet, if the network analyzer performs packet decode.

Start the application program or function to be analyzed (Block 36). This may involve loading the application program, loading or saving a document file, copying files from one network station to another, sending retrieval or update requests to a network database server, sending communications messages to an asynchronous communications gateway, etc. The application operations producing the most network traffic at peak times should be modeled. If an application operation produces minimum network activity, it need not be modeled. If this type of operation is a significant part of the system activity at peak network times then its presence can be accounted for by appropriately scaling the number of nodes represented in the simulation by traffic sources on each segment.

After the network activity completes, or the analyzer trace buffer fills up, the network analyzer capture should be stopped, and the trace buffer saved to a file (Block 36). The trace may then be reviewed on the analyzer display screen or printed. Note that on most network analyzers, the trace buffer acts as a First In First Out (FIFO) queue, meaning that once the trace buffer fills up, network packets are saved and the packets at the beginning of the trace are discarded. If it is important to preserve the beginning of the trace just after the application operation was started, the trace capture should be stopped just before the buffer fills up.

The network analyzer display options should be set (Block 34) to display packet interarrival time, packet size, source and destination station (i.e. node) addresses, and protocol decode information, if available. For ease of review, if the network analyzer allows network addresses to be given mnemonic names, the MAC level addresses of the client station and server station may be defined as new names to make the trace easier to understand. If packets traveling to or from other network stations appear in the trace, they should be removed using the display filter operation, if available.

As indicated by Block 38, the trace should be reviewed, examining the pattern of traffic between the client and server stations. Normally, unless a message is being sent which is larger than the network topology can transmit in a single packet, there will be one client request packet followed by one server response packet. The implementation packet size limits for 10-Base-T or Ethernet will be 1000 to 1500 bytes, for Token Ring 4000+ bytes, and for FDDI about 4000 bytes. If a larger message is being sent, for example an 8192 byte file block read from a Sun NFS server on a 10-Base-T network, the network transport layer, in this case UDP, will fragment the packet into five 1514 byte packets and a sixth 934 byte packet. For our purposes, these six packets should be combined into one, and accorded the timing parameters of the first packet. The timing of the continuation packets will be determined by the transmission rate of the topology, which is taken into account by the network model.

The important information in the trace is the time the client takes to send a request after the previous response (Request Packet Waiting Time), the size of the request packet (Request Packet Size), the time the server takes to send a response (Response Packet Waiting Time) and the size of the server response packet (Response Packet Size).

One or more typical client/server-request/response interactions, preferably among the most traffic intensive, should be selected for modeling (Block 38). The exact characteristics will vary greatly depending on the type of operation being modeled. In a typical network trace of several hundred to several thousand packets, only a few need be defined by a script, which can be repeated over and over during the simulation. Thus, those operations which are most often repeated throughout the trace are the most appropriate for modeling. To ascertain those operations, obvious patterns in the size of the packets being sent or received, or in the timing of the packets, should be identified. As previously discussed, all of the actual request/response interactions could be modeled in accordance with the present invention. This level of accuracy, however, is not required of the traffic models to achieve the level of accuracy desired of the network simulation.

Once an exemplary pattern of client/server activity has been identified, the following numbers should be extracted from each of the client/server-request/response interactions as indicated by Block 48 as follows:
Request Packet Waiting Time, seconds
Request Packet Size, bytes
Response Packet Waiting Time, seconds
Response Packet Size, bytes One more modification of the packet size values may be required to create the script steps from the Paradigm values. The packet size values derived from the network analyzer trace may include the data link layer overhead and the network layer overhead. These overhead bits encapsulate the actual message data as previously described. For 10-Base-T and IP, the overhead totals 34 bytes, which must be subtracted from the Client Request Packet Size and the Server Response Packet Size to produce the Client Request Size and the Server Response Size. These overhead bits are already taken into account by the models of the network itself, and would therefore create inaccurate results if not removed from the traffic model. This step is represented by Block 50 in FIG. 10.

In some circumstances, the messages being transmitted by the requesting client node or the responding server node will exceed the size of the packets by the network protocol. If this is the case, the network protocol will break up the packet into submessages which meet the maximum packet size limitation. The trace taken by the analyzer will record such a message as the series of submessages.

For purposes of modeling a request/response interaction of this nature, the submessages should be recombined (after the subtraction of any modeled overhead from each submission) to create the message packet as it would have been generated in the application layer of the network protocol. This process is reflected in Blocks 52, 58 and 62. In addition, the Request or Response Packet Waiting Time associated with the recombined Request or Response Packet should be the Request or Response Packet Waiting Time of the first submessage packet comprising the recombined packet. The network model will simulate the protocol of the network which involves the additional overhead required to break up the message and transmit the message as submessage packets. This process is illustrated by blocks 60 and 64 of FIG. 10.

In accordance with Block 54, the numbers extracted as described above are then equated to the Client/Server Paradigm parameters as follows:
Request Packet Size = Client Request Size
Request Packet Waiting Time = Client Waiting Time
Response Packet Size = Server Response Size
Response Waiting Time = Server Response Time.

Once modeled in accordance with the Client/Server Paradigm, the request/response interactions can then be converted to a script form which can be used by the Comdisco ATG to generate discrete simulation events mimicking the modeled request/response interactions.

The modeled interactions are converted to script form as described by the Create Script 22 procedure of FIG. 11.

The Client/Server Paradigm parameters are converted to ATG script parameters as follows:
Client Waiting Time < Thinking time
Client Request Size < Outgoing message length
Server Response Size < Incoming message length
Server Response Time < Remote CPU access time Note that the two size values are multiplied by 8 to convert bytes to bits, because the network model represents throughput in bits/time (Block 68). The Server Response Time is multiplied by 10 MIPS to convert to CPU instructions (Of course, other CPU access rates may be specified, depending upon the server which is actually used in the network) (Block 70). The rest of the ATG script values will be set to zero except Forced step time, which will be set to a timeout value 0.2 seconds. A timeout value is needed to model the behavior of the transport protocol layer of the network, which insures that the process will proceed if a packet is lost in transit. If a packet is lost in a physical network, the physical network will retransmit the packet. If the Forced step were not available for the simulation, however, a lost packet could mean the simulation would stall; the next packet can not be generated until a response is received. Thus, the traffic source might otherwise remain suspended without the timeout function. As indicated by Block 74 of FIG. 11, the Forced Step value should be greater than the Thinking Time or the Thinking Time parameter is negated.

It is important to understand that by assigning the Client Waiting Time parameter to the ATG script Thinking time parameter, the assumption is made that each client request is matched by a server response, and that succeeding client requests wait for the previous server response. If a step should be specified which is not correlated with a server response, the Thinking time number in the script for that step should be specified as a number greater than the Forced Step Time. The further assumption is made that the client node is not itself shared on a machine with other applications.

If a client node is running multiple applications, then the conversion of Client Waiting Time to the ATG script parameter "Thinking Time" should be from seconds to CPU instructions and specified as the ATG parameter "local CPU Access Time."

The resulting values are finally placed into a script format which can be recognized by a commercially available traffic model generator, such as the Automatic Traffic Generator (ATG) supplied by Comdisco Systems, Inc. The format can specify the parameters as a Fixed, Uniform or Exponential distribution for each value. One ATG script step is created for each client/server-request/response interaction being modeled. A RESTART step is typically included at the end of the script to indicate that the script is to be repeated during the simulation. Examples of scripts are provided in FIGS. 14a and 14b.

The script is read by the ATG to produce traffic which emanates from a traffic source connected to the modeled network to drive a simulation of the network model. If multiple client nodes, running the same application and configured with the same resources are to be modeled, the simulation need only specify identical traffic sources driven by the identical script. Although the server is specified and modeled as part of the network, it does not require a script as its traffic is already modeled as part of the client node traffic sources.

The following examples further illustrate the extraction of parameters, from actual network traffic traces, with which to model the traffic generated by a node in accordance with the present invention. The first example examines a department of 40 users operating DOS workstations using a word processing application, loading their programs and files from a Novel NetWare 386 file server. All of the stations and the server are on the same 10-Base-T LAN segment. All of the stations operate during the day, but there are variations in the level of usage. The manager of the department estimates that at most 20 stations are loading programs or files at any one time, and that this is probably the peak activity level on this network segment. After confirming this with a network monitor (Blocks 12 and 14, FIG. 8), the modeling of this application operation in accordance with the present invention is performed as follows:

Using a Network General Sniffer, a trace is recorded of a program load of the Microsoft Word application by a 386sx DOS PC client station from a NetWare 386 server station. The resource configuration of this station or node is typical of the client stations in the department. A portion of this recorded trace appears in FIGS. 15a, 15b and 15c. The DOS PC client station and the Novell NetWare server station were the only two stations operating on the network segment besides the Sniffer (i.e. network analyzer) when the trace was recorded. The normal capture trace mode of the Sniffer was used, and a trace of 597 frames was obtained covering approximately 5.4 seconds. This process is illustrated by Blocks 18, 30, 32, 34 and 36 of FIG. 9.

To examine this trace, the Bytes and Delta Time values in the Summary Display options for the Sniffer were enabled. The Display Filters Station Address From/To option was also enabled to remove packets from or to other stations on the network. Using the Display Manage Names option, the client station and server station MAC addresses are defined to be "NetWare Clnt" and "NetWare Srvr", respectively. These settings produce the display needed to construct the ATG script.

To read the trace printout of FIGS. 15a, 15b and 15c, it should be remembered that each line in the trace typically represents one packet captured on the network by the Sniffer. The values for each packet, left to right, are packet number (generated by the Sniffer) 100, packet interarrival time 102 in seconds, packet size 104 including headers but excluding packet checksum (in bytes), the destination MAC address 106, the source MAC address 108, the protocol type 110 of the highest level protocol in the packet 100, and then protocol dependent description fields 112.

In accordance with Block 38 of FIG. 9, an examination of this trace reveals that there is an obvious and exemplary pattern in the server response times during the program load file reads. From packet number 15 (FIG. 15a) to packet number 110 (FIG. 15b) for example, there are 48 client/server request/response interactions. Each client request packet is 64 bytes long, and each server response packet is 1078 bytes long. It should be pointed out that there may be other exemplary patterns of client/service interactions in the trace of FIGS. 15a, 15b and 15c which will produce accurate results if used in accordance with the present invention. During this sequence of 96 network packets, most are sent with a delay of about 1.6 to 2.0 ms. However, every eighth packet, which represents every fourth server response, takes a much longer time, from about 25 ms to 50 ms. Those of ordinary skill will appreciate that a program load is a serial file read and that the Novell NetWare server caches file blocks read from disk. Thus, it may be inferred that the additional time for every fourth file read request represents the time to read another block from disk, which is large enough to satisfy four network requests.

To model this program load file read sequence, four steps will be required which will represent the pattern of three short server responses followed by a longer one. The values extracted from the network trace sequence in accordance with Blocks 44, 46 and 48 are as follows:

| Request Packet Waiting Time = | 0.0017 s |
|---|---|
| Request Packet Size = | 64 bytes |
| Response Packet Waiting Time = | 3 at 0.0018 s |
| | 1 at 0.0350 s |
| Response Packet Size = | 1078 bytes |

One more modification of the packet size values is necessary before the model of this application activity can be scripted. One of ordinary skill will appreciate that the packet size values above include the data link layer overhead for Ethernet or 10-Base-T, and the network layer overhead for IPX. Therefore, 34 bytes must be subtracted from each packet size because any overhead data required as a function of network protocol will be accounted for by the network simulation models (block 50). This protocol overhead includes the LAN data link overhead of 114 bytes and IP network overhead of 20 bytes. If any of such overhead data is not accounted for in the network simulation models, those bits unaccounted for can simply be left as part of the Request Packet or Response Packet Size parameters. Thus, the resulting values for the Client/Server Paradigm as output from Block 54 are:

| Client Waiting Time = | 0.0017 s |
|---|---|
| Client Request Size = | 30 bytes |
| Server Response Time = | 3 at 0.0018 s |
| | 1 at 0.0350 s |
| Server Response Size = | 1044 bytes |

It should be understood that the above parameters represent the recorded traffic as modeled in accordance with the method of the present invention. Once this model is created, it can be converted to any form for purposes of creating discrete events in accordance with the model for simulation purposes. For purposes of creating a script input, in accordance with the Create Script 22 process of FIG. 11 and recognized by the Application Traffic Generator Module (ATG) available from Comdisco Systems, Inc., the two size values are multiplied by 8 to convert bytes to bits (Block 68), and the Server Response Time is multiplied by the server CPU access rate (e.g. 10 MIPS) to convert time to CPU instructions (Block 70). Client Waiting Time is specified as the "Thinking Time" parameter (Block 72). The model is thus converted to the four steps in the script from which the ATG can generate the discrete events which mimic the traffic characteristic of a client request leading to a server response requiring a disk read followed by three client requests leading to faster server responses using disk blocks already read. The resulting ATG script, including the RESTART step to indicate that the script is to be repeated during the simulation, is shown in FIG. 14a.

To simulate the network of the example, the Simulate Network procedure 28 of FIG. 13 is followed. The ATG is programmed to provide ten sources of traffic in accordance with the model as represented by the script (Block 86), which are in turn connected to the model of a 10-Base-T segment (Block 90). Also connected to the 10-Base-T segment is a traffic destination node which models the operation of the server node.

Unlike the prior art traffic sources such as those shown in FIGS. 6a, 6b and 6c, or those which simply play back a trace which was previously recorded from the network, the traffic sources generating packets in accordance with the model created through the application of the present invention will automatically vary the rate at which packets are generated as a function of the demand on server and network resources as predicted by the network model during simulation.

With previous methods of modeling traffic sources, on the other hand, even if the number of client nodes comprising the simulated network increases, resulting in a corresponding increase in the demand on the server resources, the previous traffic models continue to put out packets at the same rate because there is no feedback to the model regarding the slower overall response times of the network. This lack of feedback results in an inaccurate simulation because for a physical network the rate at which packets are generated by the client nodes will decrease (client requests that are correlated with server responses must wait for arrival of the response).

A second example of the application of the present invention involves a department of 10 design engineers operating Sun SPARC stations executing CAD applications, and loading their programs and files from a Sun SPARC station acting as a Sun NFS server. All of the stations (i.e. nodes) and the server node are on the same 10-Base-T LAN segment. All of the stations operate during the day, but there are variations in the level of usage. The manager of the department estimates that at most four stations are loading programs or files at any one time, and that this is probably the peak activity level on this network segment. After confirming this with a network monitor (Blocks 12 and 14, FIG. 8), the modeling of this application operation in accordance with the present invention continues as follows.

Using a Network General Sniffer, a trace is recorded of a program load of the BONeS ® Designer ™ 2.0 application program by a Sun SPARC station 2 with 32 MB of RAM from a Sun SPARC Station 2 NFS server station. This station is typical of the client stations (i.e. nodes) in the department. A portion of this trace appears in FIGS. 16a, 16b and 16c. Although other activity was minimized on the server and the network during the trace, other activity was present during the time the trace was recorded. The normal capture trace mode of the Sniffer was used, and a trace of 6247 frames was obtained covering approximately 242 seconds (Blocks 18, 30, 32, 34 and 36 of FIG. 9).

To examine this trace, the Bytes and Delta Time values in the Summary Display options are enabled for the Sniffer. The Display Filters Station Address From/To option is also enabled to remove packets from or to other stations on the network. Using the Display Manage Names option, the client stations and server station MAC addresses are defined to be "zeus" and "corky", respectively. These settings produce the display needed to construct the ATG script (Block 34).

To analyze the trace printout, it should be remembered that each line in the trace represents one packet captured on the network by the Sniffer. The values for each packet, left to right, are packet number 100 (generated by the Sniffer), packet interarrival time in 102 seconds, packet size 104 including headers but excluding packet checksum (in bytes), the destination MAC address 106, the source MAC address 108, the protocol type 110 of the highest level protocol incorporated in the packet 100, and then protocol dependent description fields 112.

A review of the trace reveals that the most traffic intensive network activity is represented by the large 4K or 8K block reads by the client node from the server node, as seen in packets 1 through 58 on FIG. 16a, for example. Note that the server response messages are broken up by the UDP transport protocol. In packet 37, a request to read 8192 bytes is sent from the client node to the server node. Packets 38 through 43 are the response message, which is over 8K in size, but which is sent as five 1514 byte packets and one 934 byte packet due to the packet size limitation of 10-Base-T. It is also observed that this file read activity is periodically interrupted by a request to look up another file, such as shown in packets 59 (FIG. 16a) through 64 (FIG. 16b). A reasonable approach is to model the activity as a cycle of looking up a file and then reading the contents of the file. A script which is derived from the model of the activity in accordance with the present invention, utilized during a simulation of the example network, will realistically model the traffic characteristic of a program load in progress. Further, as the number of nodes increases and the network response slows, in accordance with Block 38 the script will realistically model the traffic characteristic of a program load with the network more heavily loaded.

Choosing the packet sequence cycle from packet 59 (FIG. 16a) to packet 109 (FIG. 16b), there are 10 client-/server—request/response interactions, with the station "zeus" being the client node and the station "corky" being the server node. The client station first looks up the file name "P00005" on the server, does not find it. It then tries again while adding the file extension "sbin", finds the file and gets a file handle. The client then reads the attributes for the file handle, and in packet 65, issues a 4K byte read request for the file. The server responds with a response message containing the 1761 total bytes of the file, which still takes two packets, numbers 67 and 68, as the message size still exceeds the maximum transmit size for 10-Base-T. The client then proceeds to issue 8K byte read requests to another previously open file, completing the sequence. In each case the server response message is broken up by the UDP transport layer protocol (characteristic of the LAN protocol in use) into five 1514 byte response packets and one 934 byte response packet. One who is familiar with the application program being executed will know that the file "P00005 sbin" is one of the release patch files for the BONeS ® Designer ™ 2.0 application. Thus it can be surmised that this sequence is a program load operation reading a large file, and the relatively small patch files are being opened and read as needed. Thus, this data intensive sequence of client/server interactions will appropriately exemplify the data traffic for this application.

To mimic this sequence, 10 steps will be modeled and converted to an appropriate ATG script. Note that for the seven server response messages larger than 1500 bytes, the multiple packets representing one server response should be aggregated into one message as illustrated by Blocks 58, 60, 62 and 64. This is because the model of the traffic created by the present invention models packets created at the application layer of the network protocol. The ATG will model the process of breaking apart the application message into appropriately sized packets according to the protocol of the network being simulated. The ATG therefore recreates the UDP continuation frames while adding back the network layer and data link layer overhead bytes in the process of generating the discrete events representing traffic sourced from the node being modeled.

To calculate the correct message size for the six server 8K byte block reads, the 34 bytes of data link overhead and IP network overhead are first subtracted from the lengths of each of the six packets (Block 50, FIG. 10). This yields five Response submessage packets of 1480 bytes and one Request message subpacket of 900 bytes. The total recombined single Request Packet length is therefore 5*1480+900=8300 bytes, which reflects the 8192 bytes of data read plus 108 bytes of transport layer overhead in the first packet. This transport layer overhead is not modeled by the ATG or the Network model. The one 4K byte block read, whose response is only 1761 bytes of data, requires a Single Response Packet size of 1872 bytes.

The next issue for the Single Response Packets is what Response Packet Waiting Time to assign to them. Note from the trace that the repeated UDP continuation frames of 1514 bytes are transmitted at intervals of about 1.1 to 1.3 ms. Calculating the transmission time for 1514 bytes, a value of 1.2 ms is obtained (i.e. 1514*8/10**7=0.00121). It can be concluded that the delay on the continuation frames is simply a matter of transmission time and media contention, which the 10-Base-T model will take into account. Thus, the correct Response Packet Waiting Time for the Single Response Packet is therefore the interarrival time for the first Submessage Packet in the response (Blocks 60 and 64).

After also subtracting the 34 bytes from the length of the other Request and Response Packet Sizes, a 10 step sequence in the form of the Client/Server Paradigm in accordance with the method of the present invention is as follows:

| | | |
|---|---|---|
| 1. | Client Waiting Time = | 0.0296 s |
| | Client Request Size = | 120 bytes |
| | Server Response Time = | 0.0016 s |
| | Server Response Size = | 36 bytes |
| 2. | Client Waiting Time = | 0.0256 s |
| | Client Request Size = | 124 bytes |
| | Server Response Time = | 0.0016 s |
| | Server Response Size = | 136 bytes |
| 3. | Client Waiting Time = | 0.3606 s |
| | Client Request Size = | 108 bytes |
| | Server Response Time = | 0.0012 s |
| | Server Response Size = | 104 bytes |
| 4. | Client Waiting Time = | 0.0274 s |
| | Client Request Size = | 120 bytes |
| | Server Response Time = | 0.0143 s |
| | Server Response Size = | 1872 bytes |
| 5. | Client Waiting Time = | 0.0103 s |
| | Client Request Size = | 120 bytes |

-continued

| | | |
|---|---|---|
| | Server Response Time = | 0.0028 s |
| | Server Response Size = | 8300 bytes |
| 6. | Client Waiting Time = | 0.0128 s |
| | Client Request Size = | 120 bytes |
| | Server Response Time = | 0.0026 s |
| | Server Response Size = | 8300 bytes |
| 7. | Client Waiting Time = | 0.0029 s |
| | Client Request Size = | 120 bytes |
| | Server Response Time = | 0.0026 s |
| | Server Response Size = | 8300 bytes |
| 8. | Client Waiting Time = | 0.0042 s |
| | Client Request Size = | 120 bytes |
| | Server Response Time = | 0.0026 s |
| | Server Response Size = | 8300 bytes |
| 9. | Client Waiting Time = | 0.0084 s |
| | Client Request Size = | 120 bytes |
| | Server Response Time = | 0.0028 s |
| | Server Response Size = | 8300 bytes |
| 10. | Client Waiting Time = | 0.0049 s |
| | Client Request Size = | 120 bytes |
| | Server Response Time = | 0.0028 s |
| | Server Response Size = | 8300 bytes |

To convert the Paradigm parameters according to the Create Script procedure 22 of FIG. 11, the two size values in each step are multiplied by 8 to convert bytes to bits, and the Server Response Time in each step is multiplied by 10 MIPS to convert to CPU instructions to create 10 step ATG script to represent the sequence of a server file lookup followed by a series of large block file reads. The resulting script, including the RESTART step to indicate that the script is to be repeated during the simulation, is shown in FIG. 14b.

Note that in the third step the Forced timeout is 0.4 seconds so that it is longer than the required Client Waiting Time of 0.3606 seconds (Block 74).

The model of the network for simulation purposes is created according to the Simulate Network procedure 28 of FIG. 13 by connecting a 10-Base-T segment to the ATG which is programmed to provide four traffic sources in accordance with the model created by the method of the present invention. Thus, four nodes will create discrete events as directed by the above script to drive the simulation. A traffic destination parameter is also specified and connected to the network model.

In addition, common nodal configurations running common applications programs may be modeled in accordance with the present invention and the resulting scripts be made commercially available to users of network simulation products. This is illustrated in FIG. 12 by the procedure called Off The Shelf Scripts 26. Clearly, this would save users from recharacterizing the traffic generated by commonly encountered network nodes.

This invention has been described in an exemplary and preferred embodiment, but is not limited thereto. Those skilled in the art will recognize that a number of additional modifications and improvements can be made to the invention without departure from the essential spirit and scope. For example, the method of the present invention is applicable to any other network protocol not embodied in any of the examples, even though minor modifications to the process of extracting model parameters or converting model parameters to scripts may be required based on differences in protocols.

APPENDIX A PlanNet Application Traffic Generator Module

Introduction

This guide describes the PlanNet Application Traffic Generator Module. This module represents a host computer on a network segment.

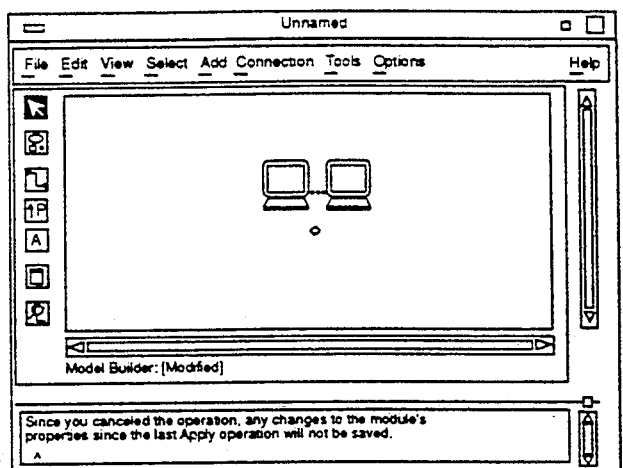

Figure 1:
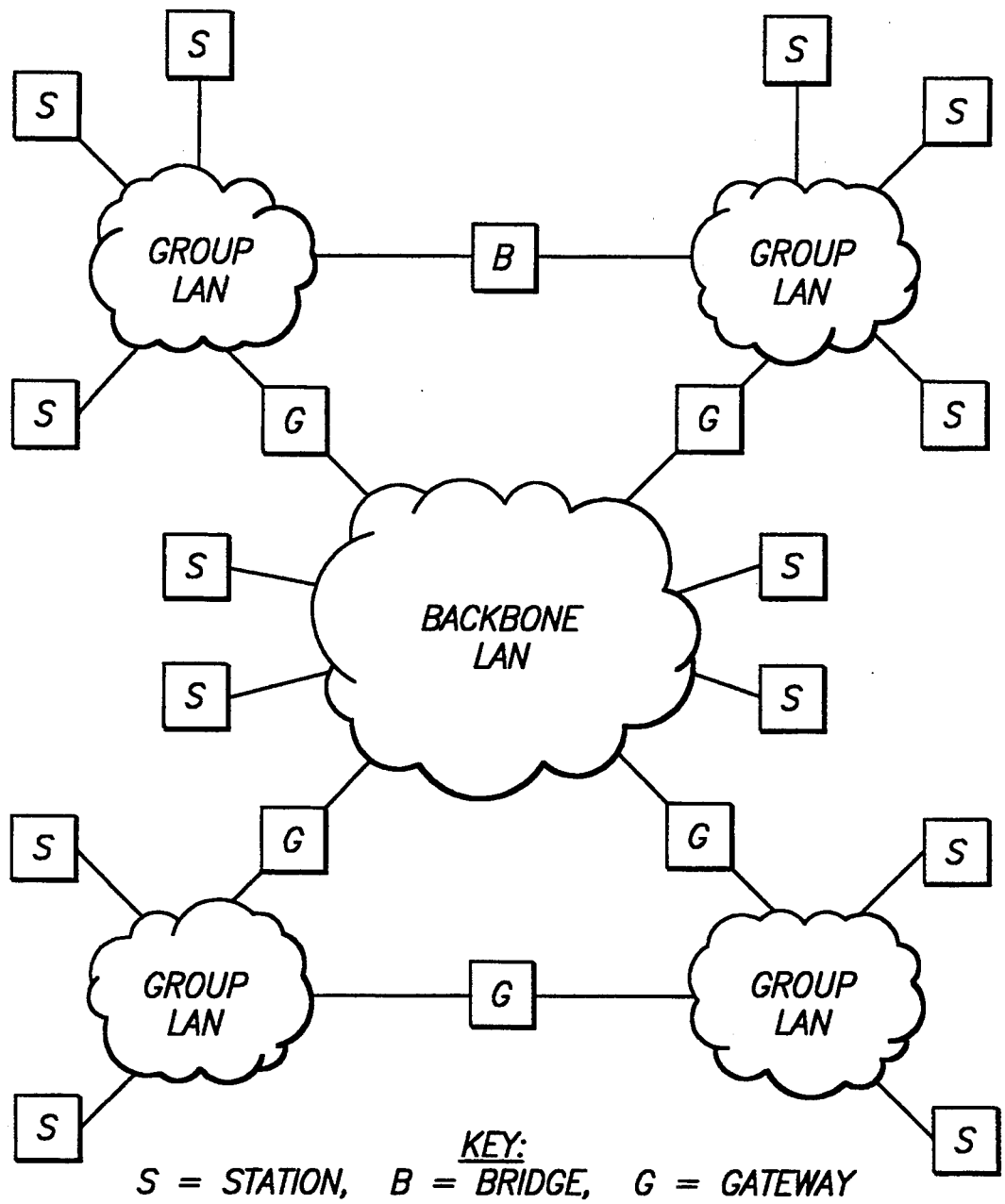
FIG. 1 is an example of a general distributed system

Figure 1: Application Traffic Generator

The Application Traffic Generator generates network traffic in the application layer which is the seventh and top layer in the ISO Open Systems Interconnect (OSI) model.

Since the traffic is generated at this top layer, all of the communication with lower layers is implied and invisible to you. You need only to be concerned with the size of the messages generated and the frequency with which they must be sent.

The host computer application layer generates traffic on the network depending on the types of programs the users are running on the host as well as the distributed network resources on which the users must rely. These resources include the media to which the users are connected (10-BASE-T, Token Ring), the CPUs in the various host computers, and the hard disks distributed throughout the network.

When network requests are fulfilled, the user may, after some thinking, present a new request. In addition, different application programs generate different typical message lengths.

The Application Traffic Generator enables users to write scripts which reflect typical demands presented by individual (or multiple) application programs. Script files can incorporate human interaction delay as well as delay attributed to remote resources.

The Application Traffic Generator module is also capable of generating traffic for multiple nodes. This capability makes the Application Traffic Generator module behave as if it were several different computers each connected to the network individually and performing independently.

You must set a parameter that determines how many host computers this one Application Traffic Generator module will represent. Thus, if you had a StarLAN segment connected to fifty computers, only two modules would need to be connected in PlanNet to represent this network: one StarLAN module and one Application Traffic Generator module representing all fifty nodes. This is demonstrated in the example system.

The Application Traffic Generator also can represent multi-tasking computers. Since each computer node is capable of simultaneously running any number of processes, each process may use a different script file to represent the different programs.

The processes that are run by a node can be simple scenarios or complex ones describing typical user actions (i.e. a database user on a workstation). Some simple scenarios have been predefined and can be used immediately.

Complex processes however, must be described using a simple format are stored in a text file (hereafter referred to as the *script file.*) *Script_files* are created using any text editor and then referred by a parameter in the Application Traffic Generator. The format of the *script_file* is explained in detail later in this guide.

The Application Traffic Generator's processes generate messages at the top or application layer of the OSI stack. The Application Traffic Generator model can be configured to collect and report certain statistics about the network and computer resources. These statistics include:

Mean Local CPU Delay
    Mean Local Disk Delay
    Mean Remote CPU Delay
    Mean Remote Disk Delay
    Total Transaction Delay
    Transactions per Second
    CPU Utilization (instructions per second)
    Disk Utilization (bits per second)

These statistics are provided by four plots. A detailed description of these plots and the statistics the display appear later in this guide.

The Application Traffic Generator is a powerful and flexible traffic generator for PlanNet. We strongly recommend that you read this chapter carefully in order to fully understand its capabilities and limitations.

The remainder of this guide provides a description of the model, a discussion of the parameters which control its operation, and a couple of examples demonstrating the proper use of the model.

Using the Application Traffic Generator Model

The Application Traffic Generator model is grouped under Traffic Models. Once the Application Traffic Generator is added to a system, it will appear as shown in Figure 1.

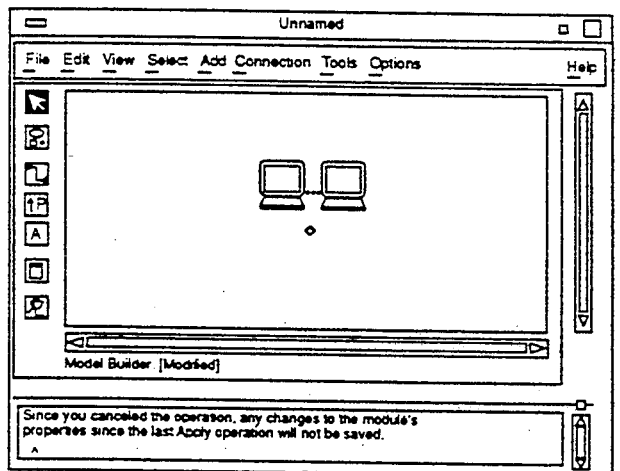

Figure 1: Application Traffic Generator Module Icon

As shown in Figure 1, the model has one port. This port can be connected to any LAN segment module (i.e. 10-Base-T, Token Ring, FDDI, etc.). A Bridge or Router module cannot be connected directly to the Application Traffic Generator module. Rather, the Bridge or Router module must be connected through any one of the LAN segment modules. The connection to any compatible port can be made through the connection option in the PlanNet.

Connecting Application Traffic Generator Modules

To connect network components to the Application Traffic Generator modules, you can use any connection scheme provided by PlanNet.

To connect an Application Traffic Generator module to an LAN segment, follow these instructions.

1. Select the LAN segment by clicking on its module.

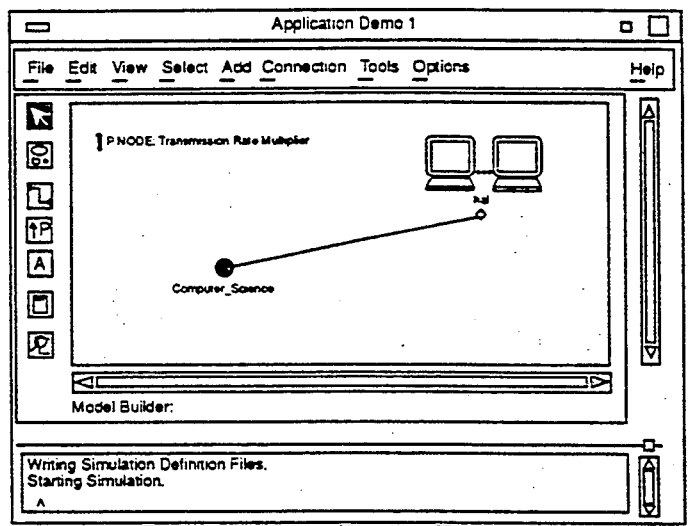

Figure 2: Connecting Application Traffic Generator

2. Select the port of the Application Traffic Generator Module by holding the CTRL key down and clicking on the module's port.

3. Select (Connection) Connect.

You can also double click on the traffic generator port to get a pen. Use this pen to draw make the connection to the LAN segment by clicking on its icon.

The Application Traffic Generator is now connected to the network, however, certain parameters of the module must be set before a simulation may be ran. These are described in the next section.

Application Traffic Generator Module Parameters

This section describes the parameters that may be set for the Application Traffic Generator module. Some of these parameters have default values; however, others require you to enter values before a simulation may be performed. To set the parameters of the Application Traffic Generator module, follow these instructions:

1. Click on the Application Traffic Generator icon

2. Select (Edit) Properties.
The Application Traffic Generator Parameter Dialog Box appears on the screen. These parameters are described in the following section.

| Label and Parameters for Module hal | |
|---|---|
| Label String | "hal" |
| NODE:Subnet Address | "cs" |
| NODE:Network Address | "uiuc" |
| NODE:Domain | "edu" |
| Number of Nodes | 50 |
| NODE:Traffic Destinations | "NODE: exp-exp" |
| NODE:CPU Speed (inst / sec) | 1.0E7 |
| NODE:Disk Speed (bits / sec) | 1000000.0 |
| NODE:Collect Stats? | Y |
| NODE:Local Disk Access Multiplier | 1.0 |
| NODE:Remote Disk Access Multiplier | 1.0 |
| NODE: Local CPU Access Multiplier | 1.0 |
| NODE:Remote CPU Access Multiplier | 1.0 |
| NODE:Transmission Rate Multiplier | "NODE. Transmission Rate Multiplier" |
| NODE: Request Message Size Multiplier | 512.0 |
| NODE: Response Message Size Multiplier | 1.0 |

[ OK ]  [ Apply ]  [ Cancel ]  [ Help ]

Figure 3: Application Traffic Generator Parameters

3. Enter the required parameters.

4. Click on OK or Apply to set the parameters.

Clicking on Cancel aborts the process of setting parameters.

Application Traffic Generator Parameters

Internet Address Parameters

These four parameters (Label, NODE: Subnet Address, NODE: Network Address and NODE: Domain) are used to describe the computer using the Internet "dot" convention. The main purpose of having four is to distinguish network boundaries for the Router module. In general, however, if a computer hal is on a network segment cs.uiuc.edu, then the Internet address would be hal.cs.uiuc.edu and the four parameters would be assigned:

```
Label                ←    "hal"
NODE:Subnet Address  ←    "cs"
NODE:Network Address ←    "uiuc"
NODE:Domain          ←    "edu"
```

Collectively, the four strings concatenated are referred to as the Internet address of the module.

Label
This parameter is primarily used to help you distinguish between several application traffic modules that might exist in one system. The label will appear below the Application Traffic Generator module in the Model Builder window. Each host module must have a unique Label.

This parameter can be set to any arbitrary string and must be placed in double quotes without spaces. (Spaces *are not* allowed in any of the four address parameters.) A valid Label could be "corky".

In the Data Analyzer, the statistics collected for a specific Application Traffic Generator module will appear under the name specified as the Label of the module. Hence, it is important to have a unique and descriptive label.

NODE:Subnet Address
> This is the address of the segment to which the traffic generator is directly connected.

NODE:Network Address
> This is typically a logical boundary for a group of LAN segments physically connected together. It may be used to represent a specific company.

NODE:Domain
> Domain represents the type of Network. Typical example are "edu", "com", "mail", etc.

Number of Nodes
> This parameter specifies the number of nodes this single Application Traffic Generator module represents. By default, the module represents one computer node.
>
> If there are several nodes on a single segment which have the same type of applications, they may be combined into one Application Traffic Generator module by setting this parameter to that number of nodes.
>
> This parameter is useful for *iterations*. By iterating over this parameter, a simulation is run for each value given to this parameter. Thus, you may find your network performance based on how many computers are attached to the network.

NODE:Traffic Destinations
> This is a string parameter which specifies the processes running on this node and the destinations to which the processes sent the traffic. Since this is a string parameter, it must be enclosed in quotes.
> The string may contain any number of processes. For each process, a destination name must be specified as well as a *script_file* that describes the process. The *script_file* is discussed in the next section.
>
> Note: For simple background traffic, the Statistical/Bursty Traffic Generator should be used. The Application Traffic Generator is best used for modeling specific computers and their applications.
>
> The destination node name can be the full Internet address of a valid Application Traffic Generator module in the simulation or a string which is a part of the full Internet address.

If the string does not match completely (i.e., does not include a full, four layer address), then any destination which matches the string is a valid destination and the Application Traffic Generator will choose one of the valid destinations at random for each message generated.

The actual name given to a Application Traffic Generator module is made up from the Internet address and the number of hosts given by the 'NODE:Number of Nodes' parameter.

If there were twenty nodes specified in the Application Traffic Generator module with Internet address hal.cs.uiuc.edu, then the full name given to the first host computer represented in this module would be "NODE:0000-hal.cs.uiuc.edu"

and on up to number

"NODE:0019-hal.cs.uiuc.edu".

All Application Traffic Generator modules prepend "NODE:" to each unique name. Thus, if an Application Traffic Generator module wishes to send the messages randomly to any single computer, the destination could be specified as NODE.

For a multitasking environment, more than one concurrent process may be specified by adding more than one process string. Each process string consists of a destination and script file pair, separated by a space. Process strings should be separated by semicolons. (In the above examples, only one process was specified.)

However, if a Application Traffic Generator module had two applications running on the operating system, the traffic string should be:

"dave.cs.uiuc.edu file1; NODE file2;"

The first process has a destination of dave.cs.uiuc.edu with a file1 traffic script, while the second has a destination NODE which will match every destination on the network. Its traffic script is file2.

When specifying the file names for the *script_file* use either the full path name or its relative path name to your home directory. Consider a user named John whose home directory path is /home/john and file directory path is /home/john/atg. If he has the file test in the /home/john/atg directory, then he need only specify atg/test for the file name, but may also specify the full search path /home/john/atg/test.

NODE:CPU Speed

This parameter specifies the CPU speed in instructions per second. The user can iterate the simulation on CPU speed. (Used only in advanced scripts.)

NODE:Disk Speed
This parameter specifies Disk access in bits per second. The simulation can be iterated on Disk Speed. (Used only in advanced scripts.)

NODE:Collect Stats?
This parameter specifies whether statistics are to be collected for a particular Application Traffic Generator. There are two possible values for this parameter: Y or N. Note carefully that there are *no* quotes around these values, and they *must be* uppercase.

Specifying Y for this parameter turns on the collection and reporting of the statistics for a particular Application Traffic Generator. The default value of this parameter is set to N.

NODE:Transmission Rate Multiplier
This parameter is used to increase or decrease the arrival rate of the messages at the top level without editing the corresponding field in the *script_file*.

For example, if you are using the default script file fixed-fixed, the transmission rate of the messages is one message per second and the request message length is one bit long.

If you wish to increase the transmission rate to 10 messages per second, specify 'NODE:Transmission Rate Multiplier' as 10. You can use this parameter to change the transmission rate even if you are using your own *script_file*. The default value of this parameter is set to one message per second.

NODE:Request Message Size Multiplier
This parameter is used to change the size of the request message length field without changing it in the *script_file*.

As in the above example, if you are using the fixed-fixed default *script_file* and you want to transmit 1000 bits/second, then specify NODE:Request Message Size Multiplier as 1000 and NODE:Transmission Rate Multiplier as 1.

You can use this parameter to change the transmission rate even if you are using your own *script_file*. Again, if you are using the default scripts, this has an effective unit of "bits per message". The default value of this parameter is set to one bit per message.

NODE:Response Message Size Multiplier
This parameter is used to can change the size of the Response Message Length field without changing it in the script file. By specifying a convenient value for this field you can change the Response Message Length. The default value of this parameter is set to one bit per message. (Used only in advanced scripts.)

NODE:Local Disk Access Multiplier
This parameter is used to increase or decrease the Local Disk Access rate. The default value of this parameter is set to one bit. (Used only in advanced scripts.)

NODE:Remote Disk Access Multiplier
By setting this parameter the user can increase or decrease the Remote Disk Access rate. The default value of this parameter is set to one bit. (Used only in advanced scripts.)

NODE:Local CPU Access Multiplier
This parameter is used to increase or decrease the Local CPU Access rate. The default value of this parameter is set to one instruction. (Used only in advanced scripts.)

NODE:Remote CPU Access Multiplier
This parameter is used to increase or decrease the Remote CPU Access rate. The default value of this parameter is set to one instruction. (Used only in advanced scripts.)

Application Traffic Generator Scripts

Default Script_files

The default *script_files* apply traffic demands on the network, but not on the Disks or CPUs in the network. These scripts are simplified traffic descriptions and are not as useful as a user-written script. The four default script_files supplied with the PlanNet library are listed below.

> fixed-fixed
> fixed-exp
> exp-fixed
> exp-exp

Each command must be a destination (followed by a white space) and its model type. There are four model types to generate messages: fixed-fixed, fixed-exp, exp-fixed, and exp-exp. These models are described below.

fixed-fixed
The simplest model (fixed-fixed) assumes both a fixed interarrival time and a fixed message length. The fixed-fixed is useful for modeling large file transfers which occur constantly, such as an ongoing tape backup across the network.

fixed-exp
The second model (fixed-exp) also uses a fixed interarrival time, but has an exponential message length.

exp-fixed
The third model (exp-fixed) has a fixed message length, but exponentially distributed interarrival times. The exp-fixed model could be useful where large files are constantly requested from a file server, but at varying times.

exp-exp
The fourth model (exp-exp) assumes a exponentially distributed interarrival time and message length. (The last two models correspond to messages with Poisson arrivals.)

User-written Script Files

This section is mainly for users who wish to make their own *script files* to better represent their application programs. You may want to make your own *script files* if you are studying any of the following:

A process which has transactions which requires a response before being able to continue (typical example is file transfer).

A process which places concurrent demands on multiple resources (i.e. Disk, CPU, and Network) and cannot continue until all the demands have been served.

Bottlenecks such as CPUs or Disks.

The following is the list of resources available for the user to call:
   Local Disk / CPU
   Remote Disk / CPU
   Network (Request / Response)

A flow chart of how the demands for these resources are fulfilled is shown in Figure 4.

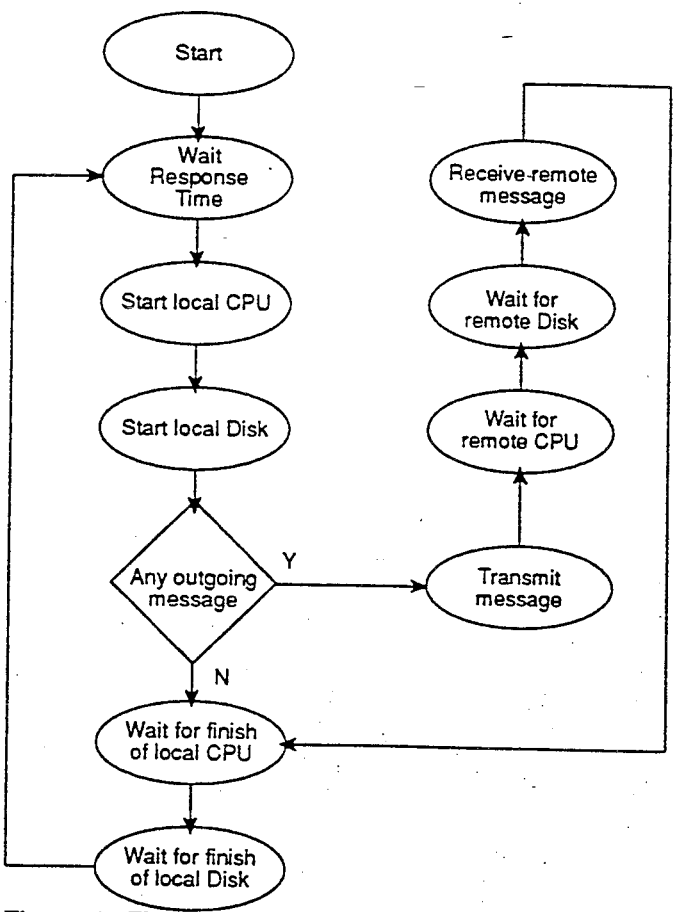

Figure 4: Flow Diagram of Demands for Resources

Format of the *script_file*

The *script_file* represents a network scenario in which two or more nodes work together to accomplish a specific task (e.g., download a file.) The scenario may include processing by both nodes, disk access, user delay, and the transmission of one or more packets across the network. The *script_file* views this transaction from the perspective of the initiating or local node. (We refer to the other node or destination as the remote node.)

The *script_file* consists of one or more records, each representing a single step. Each record contains nine fields. Each of these fields are specified through a probability distribution function or a constant. Following are the nine different fields of the *script file* :

Thinking time (seconds)
    This specifies the time between when the initiating node *receives a response to the previously sent message* from the remote node and the time the initiating node generates a subsequent (this) *message*. Notice that this implies that the previous step includes the requirement that a message be returned from the remote node. If the previous step did not require the return of a message from the remote node (this is true if the Incoming message length is zero), this step field should not be used and may be set to an arbitrarily large value to represent infinity (i.e. 1E34 can be used to represent infinity in PlanNet).

Forced-step time (seconds)
This is the time the initiating node waits from the *generation of this previous message* until *this message* is generated. Note that this field does not care if any message is to be returned for the previous message; it only looks at the message generation times. If a message is returned and the additional Thinking Time has elapsed, then this message is generated as described above. However, if the Forced-step Time period elapses before either the message is received or the additional Thinking Time is over, then the Forced-step Time forces this message to be generated. Note that if remote messages are not used (i.e. the Incoming Message Size is zero) or the Thinking Time is set arbitrarily high (with respect to the simulation time), then the Forced-step Time is the same as the interarrival time of messages generated at the module.

Outgoing message length (bits)
This is the size of the message being sent to the remote node if it is non-zero. If the size is zero, then the outgoing message is not sent.

Incoming message length (bits)
If this size is non-zero, then a message is generated at the remote node to be sent back to the source, i.e. the initiating node in this Application Traffic Generator which sent the message.

Local disk access (bits)
This is the amount of bits that need to be accessed on the local disk. This is performed in *parallel* with message generation and local CPU access.

Remote disk access (bits)
This is the size of a file that must be accessed at the remote node in *parallel* with Remote CPU access once the remote node has received the originating message.

Local CPU access (instructions)
This resource access is performed in *parallel* with local disk access and message generation.

Remote CPU access time (instructions)
This is performed in *parallel* with remote disk access upon receiving the message at the remote node destination.

Priority (interpretation is dependent upon the LAN segment)
This simply registers the priority of the message from the originating node to the destination and back in the packet. Action on the priority parameter is dependent upon which LAN segment is being used. For example, while 10-BASE-T does not implement priorities, FDDI does.

The fields described above are presented in the order in which they appear in the *script_file*. Each field is separated by a space, new-line, carriage-return or tab character. The final field (9th) requires a semicolon after it. By specifying a RESTART at the end of the *script_file* the script returns to the beginning.

Available distribution functions

Each field of the *script_file* can be either a constant or a random variable described by a probability distribution function. The random variables available to the user include exponential, normal and uniform.

Fixed value:
> Fixed values or constants are naturally the easiest to specify. They require only one argument: the constant. They are specified through the F function with the value inside the parentheses.

$$F(value)$$

For the constant 200:

$$F(200.0).$$

Exponential distribution:
> This random variable is specified with the E function with the parameters *mean, minimum,* and *maximum* values inside the parentheses separated by commas.

$$E(mean, minimum, maximum)$$

If the field was a typical exponential random variable, the *minimum* and *maximum* values would normally be zero and infinity, respectively. This would translate into 0.0 and 1E34 for PlanNet. Such a random variable with *mean* of 0.03 would appear:

$$E(0.03, 0.0, 1.0E34).$$

Uniform distribution:
> This random variable is *uniformly* distributed from the *minimum* value to its *maximum*. This is naturally represented by the U function with the two arguments separated by commas within parentheses.

$$U(minimum, maximum)$$

For a typical random variable uniformly distributed between zero and one:

$$U(0.0, 1.0).$$

Normal distribution :
> This is also referred as the Gaussian or "bell curve". This is usually specified by its *mean* and *variance*, but one is allowed to also specify its *minimum* and *maximum* values. These four parameters are specified within parentheses and separated by commas using the N function.

$$N(mean, variance[, minimum, maximum])$$

For example, a normal random variable with mean 0.05, variance 0.001, but consisting of only positive numbers:

$$N(0.05, 0.001, 0.0, 1.0E34).$$

Example Script_file

The following is a sample script file:

```
1:  F(0.05) F(1.0E34) F(400.0) F(80.0)
2:  F(0.0) F(0.0) F(0.0) F(0.0) F(0.0);
3:
4:  F(1.0E34) E(0.05,0.0,1.0E34)
5:  E(2500.0,0.0,12288.0) F(40.0)
6:  F(5.0E3) F(1.0E4) F(5.0E2)
7:  F(1.0E4) F(0.0);
8:
9:  RESTART
```

First, notice that there are nine *lines* in this file, but there are only two *steps* in the script. Each step consists of nine *fields*, and each step is separated from the next by a semicolon.

The first step, in lines 1 to 2, a message of 400 bits is sent to the remote node, which upon receiving it, would send back a packet of size 80 bits.

The second step sends a packet of an exponentially distributed random variable size with a mean of 2500 bits. A packet of 40 bits is returned.

The first step in a script file is always a special case since there is no previous step. To aid in understanding this script file, assume that at time 0.0 a null message both began and finished its transaction. This is necessary since the Thinking Time depends on the reception time of the response message, while the Fixed-Step Time depends on the generation time of the previous step.

In the script shown above, the first step schedules a fixed-step time of 1E34 after the null message began. This, of course, is larger that TSTOP, so the fixed-step time will never occur. The thinking time is 0.05s after the null transaction finishes, which is at time 0.05s since the null transaction finished at time t=0s. So, for any script file, the first step will actually occur at time min(Thinking time, Fixed-step time). Once the first step begins at t=0.05s, the second step schedules a fixed-step time to occur E(0.05,0.0,1E34) seconds after the first step starts. If we assume for discussion that this time evaluates to 0.06s, then the fixed-step time will occur at t = 0.05s + 0.06s = 0.11s.

If the response for the first step is received before this time, the thinking-time is scheduled 1E34s after reception. Since this is much larger than TSTOP, the second step will always be entered due to the fixed-step time. So, at t=0.11s the second step is entered.

The next line is RESTART, so the script file appears to PlanNet as wrapping around to the first step. Thus, the third step uses the first step as a model.

The process again repeats with the third step's fixed-step time of 1E34s being scheduled after the start of the second step. This is again greater than TSTOP, so it is ignored. However, once the second step's response is received, the third step's thinking time of 0.05s is scheduled. Assume that it took 0.02s for the response to arrive. Then at
$$t = 0.11s + 0.02s = 0.13s$$
the thinking time is scheduled for
$$t = 0.13s + 0.05s = 0.18s.$$
At this time the third step begins its transaction.

Although the actions at the remote do not directly affect this process, since this step relies on the Forced-step time, the remote disk access of 10,000 bits and execution of 500 instructions does delay any processes which may be running on the remote node, and these may interact with the initiating node.

Once the remote node has finished processing the Disk and CPU requests, it replies to the initiating node with a message of 40 bits.

However, as mentioned before, the local process *does not* wait for this acknowledgment from the remote station since this step has a Thinking time of infinity. Once this message arrives at this module, the module simply ignores it and discards it.

Application Traffic Generator Plots

The Application Traffic Generator modules generate four plots if the NODE: Collect Stats? parameter is set to Y. These plots are called:

Delay vs Iterated Parameter
    Transactions / Sec vs Iterated Parameter
    CPU Utilization vs Iterated Parameter
    Disk Utilization vs Iterated Parameter The iterated parameter which is the horizontal or X-axis of the plot must be set by the user when invoking the plot. If you have more than one iterated parameter, or several parameters which change due to the iterated parameter, you may choose one from among them for the horizontal axis.

There are three values plotted on the Delay plot. The Mean Remote Delay is a set of data describing the amount of delay which occurred for a remote request. This delay includes the remote disk, CPU and the transmission there and back. The Mean CPU Delay is a set of data measuring the delay which occurred in the local CPU for processing the request. Similarly the delay which occurred in the local Disk for processing a request is shown in the Mean Disk Delay set of values Transactions / Sec vs Iterated Parameter reports the total number of transactions performed by the Application Traffic Generator in one second. A transaction is counted *only if* it completes. Thus, if a transaction is aborted due to Fixed-Step Time field, the previous message is not counted as a transaction.

CPU Utilization reports that portion of the CPU capacity in instructions per second which is consumed by all the nodes in the Application Traffic Generator.

Disk Utilization is the that portion of the Disk capacity in bits per second which is consumed by all nodes in the Application Traffic Generator.

Application Traffic Generator Example

The objective of this section is to demonstrate how to use the Application Traffic Generator module described in this guide. This example shows a *script_file* written for a custom application.

Figure 5 shows an example system named "Application Demo" which is located under the "Example Systems" group. This example is provided with the PlanNet Application Traffic Generator library.

We recommend that before you run this example you first create a writable version in your own library using the (Edit) Save As command and then use this new version for your experiments. (This preserves the original example so others can use it.) Another alternative is to build this model from scratch and use the example to examine how this one is constructed. The instructions given in this section help you to build your own example system from scratch similar to the one in the library.

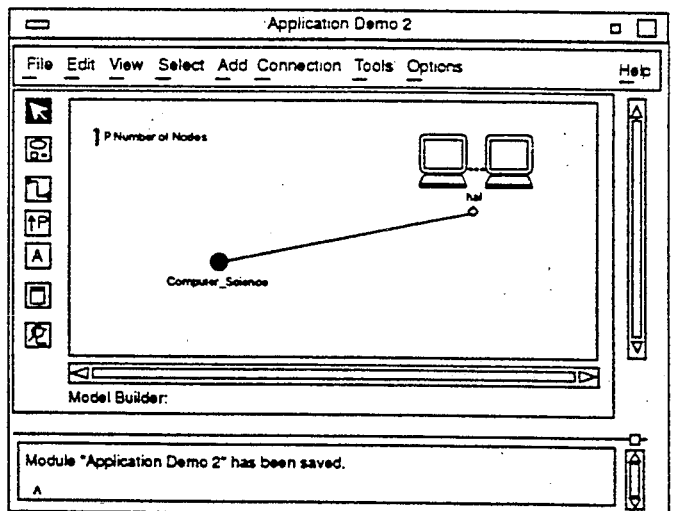

Figure 5: Application Demo

****Artist, Jean: The character to the right of "Application Demo" in the title bar of this figure should be removed.

Select the Model Builder tool in the main window.

Select (File) New to create a new window.

Click on the Module tool and select Application Traffic from the Traffic Models group.

Click on OK.
This gives you a Cross-Hair pointer which allows you to place the Application Traffic Generator Module on the canvas.

Position the pointer where you would like the module and click.

Select the Module tool and find StarLAN under the LAN Segments group.

Select StarLAN and click OK.

Position the Cross-Hair pointer and click.

To connect the two together, click on the Application Traffic Generator Module port twice and then click on the StarLAN segment.

Select the Application Traffic Generator icon and (Edit) Parameter.
This opens the parameter window for this module.

| | Label and Parameters for Module hal |
|---|---|
| Label String | "hal" |
| NODE.Subnet Address | "cs" |
| NODE.Network Address | "uiuc" |
| NODE.Domain | "edu" |
| Number of Nodes | "Number of Nodes" |
| NODE:Traffic Destinations | "NODE application_demo_2" |
| NODE:CPU Speed (inst / sec) | 1.0E7 |
| NODE:Disk Speed (bits / sec) | 1000000.0 |
| NODE:Collect Stats? | Y |
| NODE:Local Disk Access Multiplier | 1.0 |
| NODE:Remote Disk Access Multiplier | 1.0 |
| NODE: Local CPU Access Multiplier | 1.0 |
| NODE:Remote CPU Access Multiplier | 1.0 |
| NODE.Transmission Rate Multiplier | 1.0 |
| NODE: Request Message Size Multiplier | 1.0 |
| NODE: Response Message Size Multiplier | 1.0 |

[ OK ] [ Apply ] [ Cancel ] [ Help ]

Figure 6: Application Traffic Generator Parameters

****Artist, Jean: The text in line 6 (NODE: Traffic Destinations) should be "NODE application_demo"

Enter the parameters as you see them listed in Fig. 6. Notice that the first four parameters are be in double quotes, as is the sixth. However, the ninth parameter NODE:Collect Stats? must only be a Y or a N *without quotes*.

The sixth item in the parameter box is the string
"NODE application_demo"
which informs the Application Traffic Generator module that each node represented by this module will send traffic to any of the nodes, since "NODE" will match all node names. As mentioned in the *Parameter* section of this guide, all the nodes have the string "NODE" prepended to their name, so the string NODE will match *all* the available nodes. This means that the destination for each message will be selected randomly from the available nodes. The last part of the string, application_demo, is the name of the *script_file* to be used. If you use this name, the default script provided with the PlanNet library is used. However, if you wish to create your own with a text editor, type the following lines into a text editor F(1.0E34)  E(0.05,0.0,1.0E34)   E(2500.0,0.0,5100.0)  F(4000.0)
F(0.0)  F(0.0)  F(5.0E3)  F(1.0E4)  F(0.0)  ; RESTART and save them into a file. You then need to specify the *full path name* of the file which you just created in the 'NODE:Traffic Destinations' parameter, if the file does not reside in your home directory. If you do create your own script file, give a different name than application_demo; otherwise the internal PlanNet script file will override yours.

Notice that Number of Nodes is being used as the iterated parameter. (It is shown in fifth line of the parameter box shown in Figure 6.) To create this parameter in the fifth line as shown in Figure 6, click on the Extend button next to the fifth field and select "Export As Is". This will automatically create the parameter in the Model Builder window.

When all the changes have been made in the parameter box, click on OK and the window will close. You now have to set the iterated parameter Number of Nodes values. To do this, click on this parameter in the Model Builder window. Select (Edit) Parameters and its parameter window will open. Enter the values as shown in Figure 7. Click on OK when you are finished.

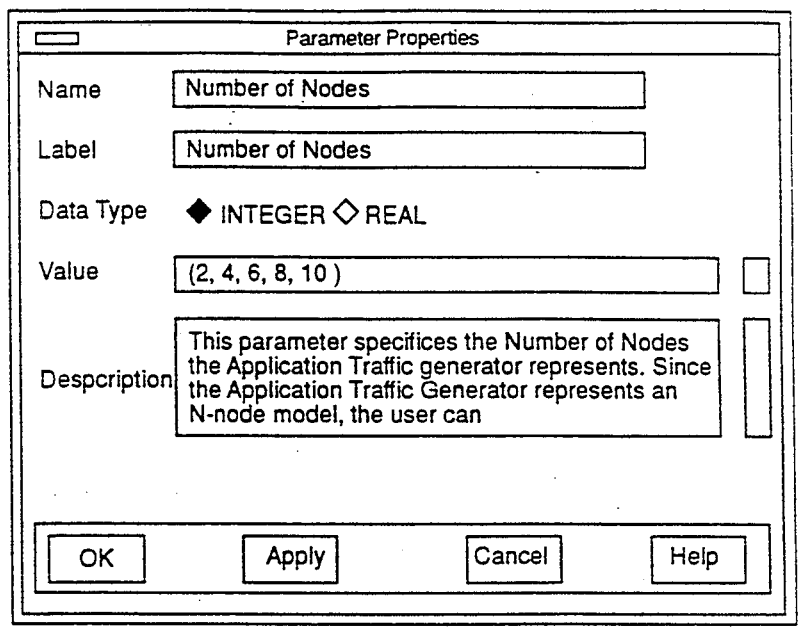

Figure 7: Values for NODE:Number of Nodes

Now, click on the StarLAN icon and select (Edit) Parameter to open its parameter window. Enter the parameters as shown in Figure 8. Make sure that the parameter StarLAN: Collect Stats? parameter has the value Y. Click on OK when finished.

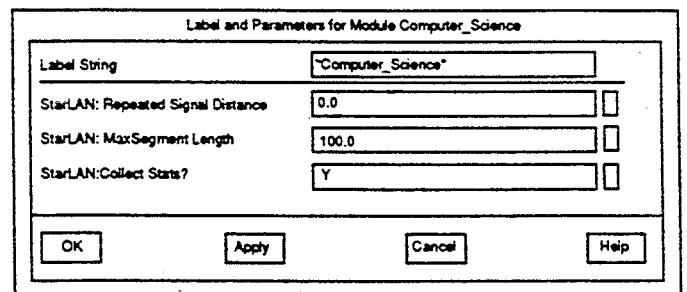

Figure 8: Parameters for StarLAN Module

You now have built your first system. Save the system by selecting (File) Verify and Save and give it a name, library, and group. When you have entered the information, click on OK. You must have a library open for write if you want to save this system. If you don't, cancel this window and open a library for write from the main window and repeat the procedure in this paragraph.

To simulation the system, select (Tools) Simulate from the Model Builder window and enter the values as shown in Figure 9. The Machine Name should be your machine name, which is probably the default value. When you have finished, click on OK. The simulation will begin and a monitor window will open to inform you of the simulation progress.

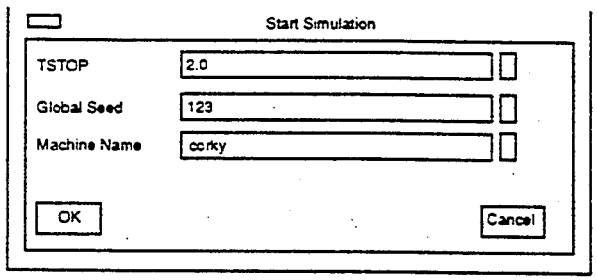

Figure 9: Simulation Window

****Artist, Jean--line is missing at the top of this figure. Also, the value of TSTOP should be 5.0.

When all the simulations finish, close the Monitor Window. You can now examine the plots generated by the simulation. Return to the Main Window and select the Data Analyzer tool. Locate the group of your simulation (which will have the same name as the one under which you saved the system.) Once you enter this group, you should see the nine plots available as shown in Figure 10.

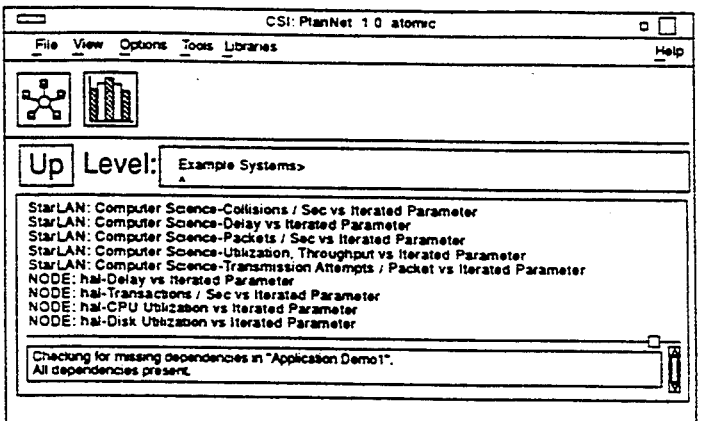

Figure 10: Main Window Showing Available Plots

Click on "StarLAN: Computer_Science - Delay vs. Iterated Parameter".

Two windows will open. The "Specify Parameters"

window lets you choose the X-axis for the plot. Select "Number of Nodes" iterated.

Click on OK.

You should see a plot similar to Figure 11.

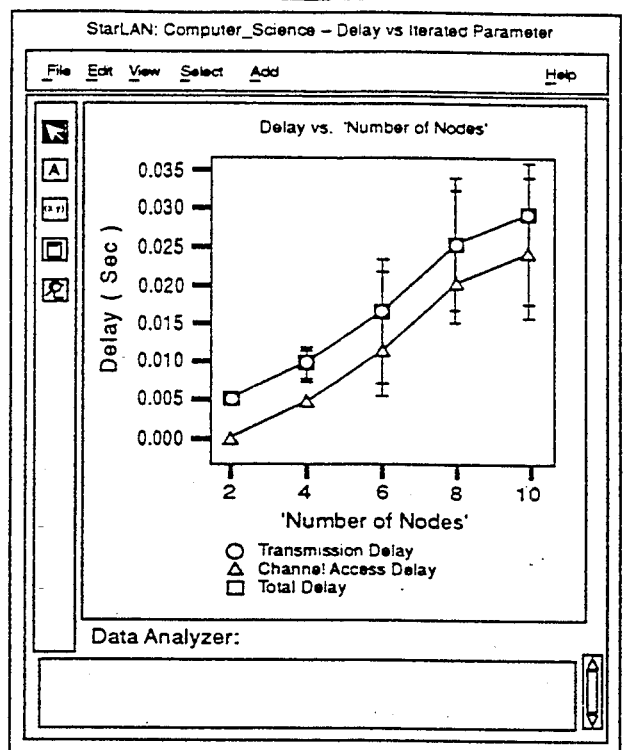

Figure 11: Transmission Delay

Figure 12 shows the round-trip delay for a message. To create this plot, follow the same steps that you took to create the plot for Figure 11. Notice that at around 6 nodes, the round-trip delay increases dramatically. A network administrator may find this increased delay unacceptable and decide to limit the number of nodes on this segment to 6.

The information shown in Figure 12 is quite different from that shown in Figure 11 and provides a graphic illustration of the analytic power of simulation models. Figure 11 represents the kind of network behavior analysis provided by most network analyzers; it would be very difficult to develop the information shown in Figure 12 with any analyzer.

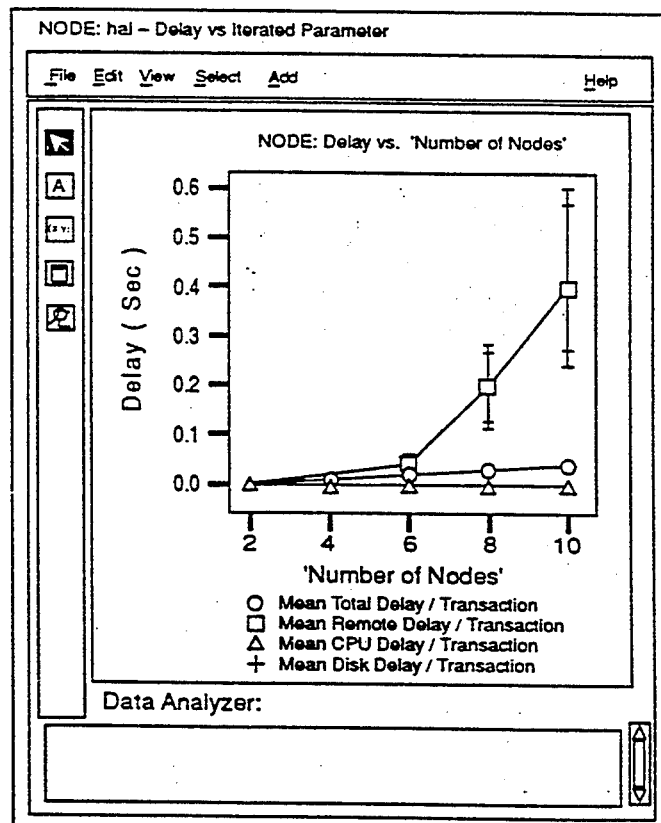

Figure 12: Round-trip Delay.

Application Traffic Generator Guidelines

This section summarizes some important points about the Application Traffic Generator module.

The Application Traffic Generator cannot be *directly* connected to a bridge. It *can only* be connected to any of the arbitration module.

There should not be any spaces in the label string of any module.

The destination and the *script_file* name must be separated by a space in the traffic string.

The *script_file* path name cannot be specified with the tilde "~" symbol. If the given script file name does not exists in the specified path, the simulation fails and an error message (error opening script file!) is generated. The path name may be relative to your home or an absolute path name.

A distributions corresponding to each of all the nine fields must be specified. Each field must be separated from the preceding field by a space. A semicolon should follow the ninth field. If there is more than one parameter in a distribution function then each parameter inside the parentheses should be separated by a comma.

Spaces are not allowed within the distribution function parentheses.

The Application Traffic Generator Module includes a separate program parse_atg to check the syntax of your scripts. We strongly recommend that you run this program on all scripts before using them in simulations, since PlanNet will only do a simple syntax check.

Missing semicolons are mentioned with an error message. Similarly missing braces in the distribution function are also prompted with an error message. The RESTART can be specified in all lower case or upper case letters.

In the IP layer of the application traffic generator an IP overhead of 160 bits is added to the message length of each message. The largest segment size for the IP fragment is the largest which can be handled by the 10-BASE-T module.

We claim:

1. A method of simulating data traffic being transmitted over a network among a plurality of nodes interconnected by the network, the data traffic comprising a plurality of conversations among the plurality of nodes, one or more of the plurality of nodes being a client node and one or more of the plurality of nodes being a server node, said method comprising the steps of:

providing a model representative of the network;

characterizing one or more of the plurality of conversations as a series of one or more request/response interactions, each of the one or more interactions comprising transmission of a request message from one of the one or more client nodes to one of the one or more server nodes, and wherein none, some or all of the one or more interactions further comprise transmission of a response message associated with the request message, the associated response message transmitted from the one server node back to the one client node in response to receiving the request message; and generating data representative of the one or more interactions of each of the characterized conversations, said step of generating further comprising the steps of:

inputting the generated data for each of the interactions into the network model to determine when the associated response message of each of the interactions having one are received by the one client; and when the request message of one of the interactions is dependent on the one client node's receipt of the response message associated with a previously generated request message, delaying the inputting of the data representative of the dependent interaction into the network model until the response message associated with the previously generated request message is received by the one client node as determined by the network model.

2. The method of claim 1 wherein said step of characterizing one or more of the plurality of conversations further comprises the steps of:

determining a peak level of data traffic over the network; and defining the one or more of the plurality of conversations to characterize as those which are active when the network is at the peak traffic level.

3. The method of claim 2 wherein said step of characterizing further comprises the step of limiting the series of one or more request/response interactions for each of the characterized conversations to those interactions which are the most data intensive and the most exemplary of the conversation.

4. The method of claim 3 wherein said step of limiting is performed for each characterized conversation assuming no other of the plurality of conversations are present on the network.

5. The method of claim 3 wherein said step of limiting is performed using output from a network analyzer connected to the network, the output measured for each of the characterized conversations with minimal presence of other of the plurality of conversations present on the network.

6. The method of claim 4 wherein the extracted parameters are converted to scripts, the scripts capable of being read by a traffic generator to generate data traffic in accordance therewith.

7. The method of claim 11 wherein the extracted parameters are converted to scripts, the scripts capable of being read by a traffic generator to generate data traffic in accordance therewith.

8. The method of claim 2 wherein said step of determining the peak level of data traffic is performed by a network analyzer.

9. The method of claim 2 wherein said step of defining the one or more of the plurality of conversations is performed by a network analyzer.

10. The method of claim 1 wherein said step of inputting data to the network model further comprises the steps of:

determining when the request message arrives at the one server node for processing; and determining when the associated response message is generated by the one server node.

11. The method of claim 10 wherein said characterizing step further comprises the step of extracting from each of the one or more request/response interactions a set of interaction parameters including a Client Waiting Time, a Client Request Size, a Server Response Time and a Server Response Size.

12. The method of claim 11 wherein said step of determining when the request message arrives further comprises the step of using the network model to determine the time necessary for the request message to traverse the network from the one client node to the one server node based on the Client Request Size.

13. The method of claim 12 wherein said step of determining when the request message arrives further comprises the step of using the network model to account for time associated with contention for access to the one server node.

14. The method of claim 11 wherein said step of inputting the generated data further comprises the step of using the network model to determine the time for the associated response message to traverse the network from the one server node to the one client node as a function of the Server Response Size.

15. The method of claim 11 wherein the one server node represents remote data processing resources and wherein the Server Response Time is a function of the throughput of the remote data processing resources.

16. The method of claim 11 wherein said step of generating further comprises the steps of:

for each of the one or more interactions, scheduling the generation of the request message upon expiration of the Client Waiting Time;

when transmission of the request message is dependent upon the receipt by the one client node of the response message associated with a previously generated request message, triggering the Client Waiting Time upon receipt; and when transmission is not dependent, triggering the Client Waiting Time upon generation of the previous request message.

17. The method of claim 16 wherein the one client node represents local data processing resources and the Client Waiting Time is a function of the throughput of the local data processing resources and thinking time attributable to a user.

18. The method of claim 11 wherein the network model includes a model of the one server node, said step of determining when the associated response message is generated further comprises said step of using the one server node model to determine the time necessary to generate the associated response message based on the Server Response Time.

* * * * *

UNITED STATES PATENT AND TRADEMARK OFFICE
CERTIFICATE OF CORRECTION

PATENT NO. : 5,440,719

DATED : August 8, 1995

INVENTOR(S) : Charles F. Hanes and Colin K. Mick

It is certified that error appears in the above-identified patent and that said Letters Patent is hereby corrected as shown below:

On the title page, item [54] and Col.1, line 3, please replace "CLIENT/SEWER" with -- CLIENT/SERVER --.

Signed and Sealed this

Eleventh Day of May, 1999

Attest:

Q. TODD DICKINSON

*Attesting Officer*   *Acting Commissioner of Patents and Trademarks*